(12) United States Patent
Yamazaki et al.

(10) Patent No.: US 6,703,643 B2
(45) Date of Patent: Mar. 9, 2004

(54) ACTIVE MATRIX DISPLAY DEVICE WITH AN INTEGRATED CIRCUIT COVERED WITH A SEALING MATERIAL

(75) Inventors: Shunpei Yamazaki, Tokyo (JP); Jun Koyama, Kanagawa (JP); Yuji Kawasaki, Kanagawa (JP); Toshimitsu Konuma, Kanagawa (JP); Satoshi Teramoto, Kanagawa (JP); Yoshiharu Hirakata, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 75 days.

(21) Appl. No.: 10/037,103

(22) Filed: Dec. 31, 2001

(65) Prior Publication Data

US 2002/0056844 A1 May 16, 2002

Related U.S. Application Data

(62) Division of application No. 09/287,551, filed on Apr. 5, 1999, now Pat. No. 6,355,942, which is a continuation of application No. 08/601,956, filed on Feb. 15, 1996, now Pat. No. 6,011,607.

(30) Foreign Application Priority Data

| Feb. 15, 1995 | (JP) | .............................................. 7-50527 |
| Mar. 20, 1995 | (JP) | .............................................. 7-87369 |
| Dec. 20, 1995 | (JP) | ............................................ 7-349669 |

(51) Int. Cl.⁷ .......................................... H01L 29/267
(52) U.S. Cl. ...................................... 257/81; 81/257
(58) Field of Search ................................. 349/153, 151, 349/160; 345/765, 706

(56) References Cited

U.S. PATENT DOCUMENTS

| 4,394,067 A | * | 7/1983 | Spruijt et al. ............... 349/151 |
| 4,782,340 A | * | 11/1988 | Czubatyj et al. ............ 345/205 |
| 4,826,297 A | | 5/1989 | Kubo et al. |
| 5,076,667 A | * | 12/1991 | Stewart et al. .............. 349/139 |
| 5,095,304 A | * | 3/1992 | Young ......................... 345/208 |
| 5,148,301 A | * | 9/1992 | Sawatsubashi et al. ..... 349/153 |
| 5,151,689 A | | 9/1992 | Kabuto et al. |
| 5,155,612 A | | 10/1992 | Adachi et al. |
| 5,347,154 A | * | 9/1994 | Takahashi et al. .......... 257/347 |
| 5,517,344 A | * | 5/1996 | Hu et al. .................... 349/149 |
| 5,563,427 A | * | 10/1996 | Yudasaka et al. ............. 257/72 |
| 5,606,194 A | | 2/1997 | Lebrun et al. |
| 5,608,232 A | | 3/1997 | Yamazaki et al. ............ 257/66 |
| 5,637,187 A | | 6/1997 | Takasu et al. |
| 5,639,698 A | | 6/1997 | Yamazaki et al. .......... 437/228 |
| 5,691,794 A | | 11/1997 | Hoshi et al. |
| 5,744,824 A | * | 4/1998 | Kousai et al. ................ 257/64 |
| 5,757,445 A | * | 5/1998 | Vu et al. ...................... 349/45 |
| 6,067,062 A | | 5/2000 | Takasu et al. |
| 6,304,243 B1 | | 10/2001 | Kondo et al. |

FOREIGN PATENT DOCUMENTS

| EP | 0 025 250 | 3/1981 |
| EP | 0 226 997 | 7/1987 |
| EP | 0 402 170 | 12/1990 |
| EP | 0 444 621 | 9/1991 |
| EP | 0 474 474 | 3/1992 |

(List continued on next page.)

Primary Examiner—Kenneth Parker
(74) Attorney, Agent, or Firm—Fish & Richardson P.C.

(57) ABSTRACT

An active matrix liquid crystal display having improved reliability. Pixel regions and a peripheral driver circuit are integrally packed on the display. TFTs forming the peripheral driver circuit are located inside a sealing material layer on the side of a liquid crystal material, thus protecting the peripheral driver circuit from external moisture and contaminants. This enhances the long-term reliability of the peripheral driver circuit. Pixel TFTs are arranged in pixel regions. The leads going from the TFTs forming the peripheral driver circuit to the pixel TFTs are shortened. This results in a reduction in the resistance. As a result, the display characteristics are improved.

16 Claims, 15 Drawing Sheets

FOREIGN PATENT DOCUMENTS

| | | | |
|---|---|---|---|
| EP | 0 593 266 | | 4/1994 |
| EP | 0 609 809 | | 8/1994 |
| JP | 56-40879 | | 4/1981 |
| JP | 58-160923 | | 9/1983 |
| JP | 59-048735 | | 3/1984 |
| JP | 59-214075 | | 12/1984 |
| JP | 61-177481 | | 8/1986 |
| JP | 62-150858 | | 7/1987 |
| JP | 64-49022 | * | 2/1989 |
| JP | 62-251723 | * | 2/1989 |
| JP | 1-68725 | * | 3/1989 |
| JP | 2-42420 | | 2/1990 |
| JP | 2-242230 | | 9/1990 |
| JP | 3-12635 | | 1/1991 |
| JP | 3-12636 | | 1/1991 |
| JP | 3-110486 | | 11/1991 |
| JP | 4-6030 | | 1/1992 |
| JP | 4-362924 | | 12/1992 |
| JP | 6-118404 | | 4/1994 |
| JP | 6-138488 | | 5/1994 |
| JP | 6-186578 | | 7/1994 |
| JP | 6-202160 | | 7/1994 |
| JP | 6-230350 | | 8/1994 |
| JP | 6-258650 | | 9/1994 |
| JP | 406244103 A | * | 9/1994 |
| JP | 406244104 A | * | 9/1994 ................. 257/72 |
| JP | 6-289415 | | 10/1994 |
| JP | 8-500910 | | 1/1996 |
| WO | WO94/00795 | | 1/1994 |

* cited by examiner

TFTs for peripheral circuit ——|—— TFTs for active matrix circuit

US 6,703,643 B2

ACTIVE MATRIX DISPLAY DEVICE WITH AN INTEGRATED CIRCUIT COVERED WITH A SEALING MATERIAL

The present application is a divisional of U.S. patent application Ser. No.: 09/287,551, filed Apr. 5, 1999 now U.S. Pat. No. 6,355,942, which is a continuation of U.S. patent application Ser. No.: 08/601,956, filed Feb. 15, 1996, now U.S. Pat. No. 6,011,607.

BACKGROUND OF THE INVENTION

1. Field of the Invention

The present invention relates to techniques for miniaturizing active matrix displays and for enhancing their reliability.

2. Description of the Related Art

The state of a panel forming the prior art active matrix display is shown in FIG. 4 in cross section. As can be seen from this figure, a sealing material 402 surrounds a pixel region 404 and so only the pixel region 404 of the active matrix display is in contact with a liquid crystal material. TFTs in a peripheral driver circuit region 403 are in contact with the atmosphere. These are remains of the prior art techniques in which only pixel TFTs are present on the substrate of an active matrix display, and in which a driver circuit is an externally attached IC. In these prior art techniques, the position at which the driver circuit is mounted is not optimized where the pixel region 404 and the peripheral driver circuit region 403 are formed on the same glass substrate 401.

In the prior art active matrix display, the TFTs of the driver circuit are exposed. Therefore, during assembly of the panel, the substrate of the active matrix display must be handled with meticulous care. Under these circumstances, there is a demand for an active matrix display which assumes such a form that the display is handled with ease during fabrication processes. Pixels are protected by the liquid crystal material, the sealing material, and other materials for securing high reliability. On the other hand, the driver circuit is coated with only a thin oxide film. Therefore, the driver circuit does not have sufficient temperature resistance, and is vulnerable to contamination.

SUMMARY OF THE INVENTION

In order to minimize the damage sustained during assembly of the panel of the driver circuit of an active matrix display in an attempt to solve the problems with the reliability, the driver circuit of the active matrix display may take such a form that the user cannot directly touch it. Accordingly, as shown in FIG. 1, the peripheral driver circuit region 103 of the aforementioned active matrix display is buried either in the liquid crystal material or in the sealing material.

One invention disclosed herein is an active matrix display which is similar to the above-described active matrix display where pixel TFTs and TFTs forming the driver circuit for the pixels are formed on the same substrate. A liquid crystal material is sealed in so that both pixel TFTs and TFTs of the driver circuit are in contact with the liquid crystal material directly or via a thin film.

Generally, a thin-film transistor (TFT) is coated with an interlayer dielectric film consisting of a film of silicon oxide or the like. Therefore, the TFT is in contact with the liquid crystal material via this dielectric film. By adopting this structure, the TFTs of the peripheral driver circuit can be substantially sealed in the liquid crystal material. That is, the TFTs of the peripheral driver circuit can be sealed by the liquid crystal material.

Another invention has a pair of transparent substrates between which a liquid crystal material is held. TFTs are arranged in rows and columns on the surface of one of the substrates, thus forming a matrix circuit. A peripheral driver circuit consisting of TFTs is connected with the matrix circuit. A liquid crystal material or sealing material is present on the top surface of the peripheral driver circuit. A space for accommodating an integrated circuit connected with the peripheral driver circuit is formed between the substrates.

A specific example of the above-described structure is shown in FIG. 2 which is a schematic cross section of an active matrix display having a pair of glass substrates 202 and a liquid crystal material 209 held between the substrates. The configuration shown in FIG. 2 has TFTs 207 of the active matrix circuit; TFTs 208 of the peripheral driver circuit for driving the TFTs 207, and an integrated circuit 211 for sending video signals and various control signals to the TFTs 208 of the peripheral driver circuit.

In the structure shown in FIG. 2, the liquid crystal material exists on the top surface of each TFT 208 of the peripheral driver circuit. The integrated circuit 211 sealed by a sealing material 210 is disposed in a space formed between the glass substrates 202.

Another invention is an active matrix display characterized in that the pixel TFTs of the active matrix display and the TFTs of the driver circuit for activating the pixels are present on the same substrate, and that the TFTs of the driver circuit are sealed by the sealing material.

A specific example of the above-described structure is shown in FIG. 3, where TFTs 308 forming the peripheral driver circuit are sealed by a sealing material 310.

The peripheral driver circuit region is located either within the region where the liquid crystal material exists or within the sealing material. It substantially follows that the peripheral driver circuit region is sealed in the liquid crystal material or in the sealing material. This can prevent extraneous moisture from encroaching on the peripheral driver circuit region of high packaging density. Furthermore, the effects of stress can be mitigated.

To minimize the damage of a drive circuit in an active matrix liquid crystal display device in a panel assembly process, and to solve the problem of reliability, an active matrix liquid crystal display device is required to be manufactured such that the drive circuit thereof cannot be touched directly. Therefore, a peripheral drive circuit region 803 of an active matrix liquid crystal display device is mounted in liquid crystal or sealing material as shown in FIG. 8.

FIG. 8 shows an embodiment in which a single glass substrate 801 is constituted of four panels. The substrate shown in FIG. 8 is constituted of a peripheral drive circuit 803 and a pixel area 804 which are integrated on the same glass substrate. The pixel area 804 is constituted of at least one thin-film transistor which is connected to a pixel electrode arranged like a matrix.

In FIG. 8, only the glass substrate 801 on which each circuit is formed is shown, however, another glass substrate opposite to it is actually arranged. A counter electrode is arranged on the opposite glass substrate not shown.

Further, in the constitution shown in FIG. 8, the active matrix liquid display device is divided by sealing material 802 so as to realize a manufacturing of a plurality of active matrix liquid crystal display panels on a pair of glass substrates. With such a constitution, the productivity and the reliability can be simultaneously enhanced.

It should be noted that although the width of the sealing material 802 is equal in FIG. 8, it may be widened to provide a margin for cutting the glass substrate 802 in an area where it is cut. For example, as shown in FIG. 9, the width of the cross area of a sealing material 800 that divides liquid crystal display device may be approximately twice as wide as that of an edge area around the glass substrate 801. In FIG. 9, the same reference numeral as in FIG. 8 denotes the same member.

DETAILED DESCRIPTION OF THE PREFERRED EMBODIMENTS

EXAMPLE 1

Figure 1:
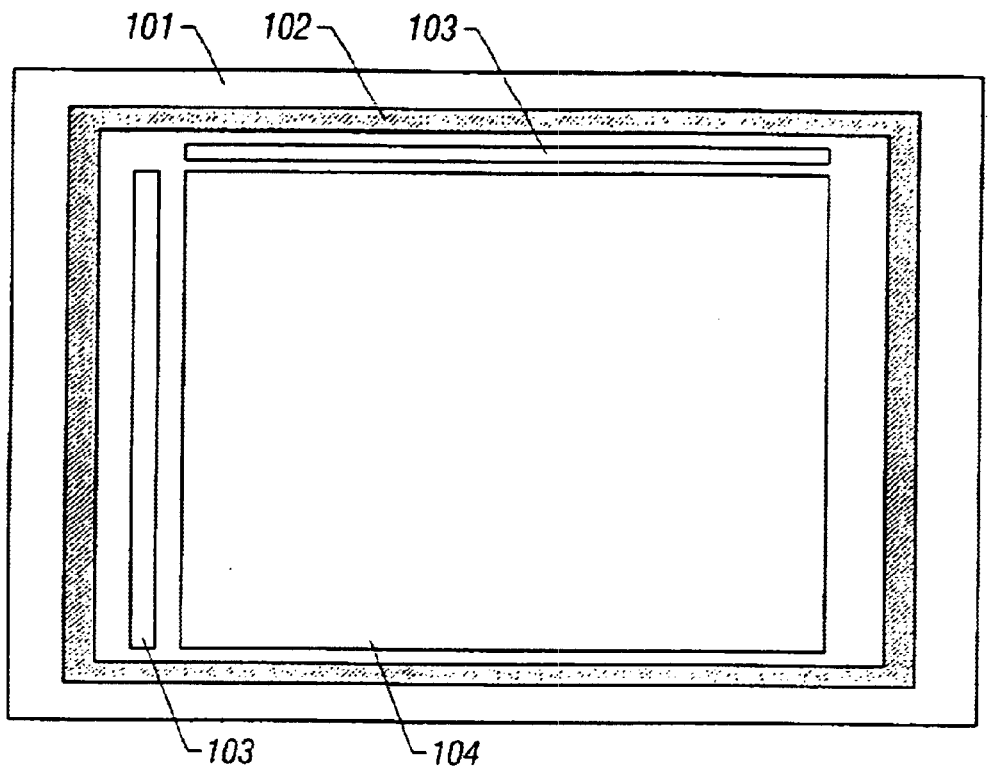
FIG. 1 is a schematic view of an active matrix display according to the present invention.
Figure 2:
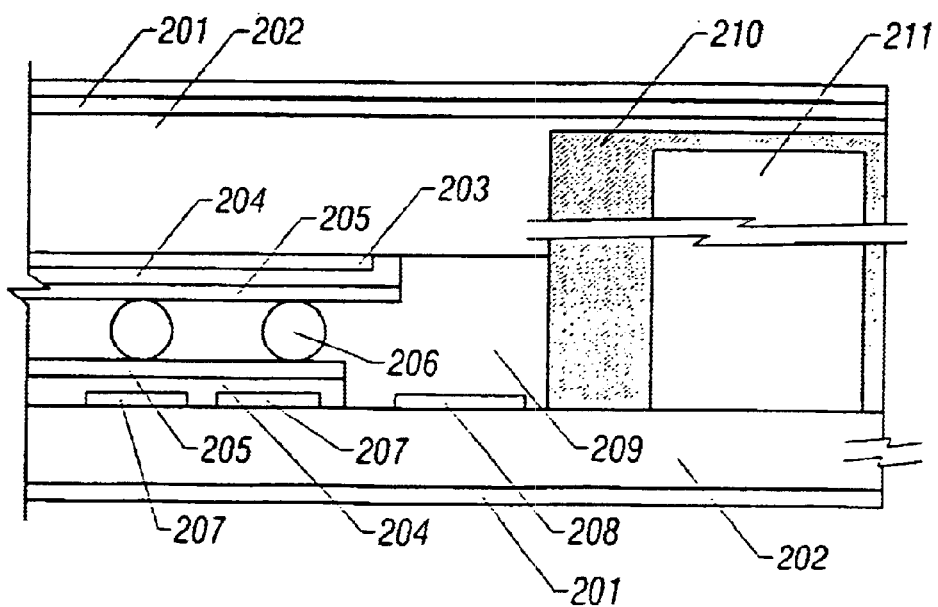
FIG. 2 is a cross-sectional view of an active matrix display according to Example 1 of the invention.

An active matrix display according to the present invention is shown in FIG. 2 in cross section. This active matrix display has a glass substrate 202 on which pixel TFTs 207 are formed. A transparent electrode 204 and an orientation film 205 are laminated on the pixel TFTs 207. This glass substrate is referred to as the TFT substrate. This TFT substrate comprises a polarizing sheet 201 and the glass substrate 202 which are arrayed in this order in the direction towards a liquid crystal material 209.

The other glass substrate is referred to as the color filter substrate and comprises an orientation film 205, a transparent electrode 204, color filters 203, a glass substrate 202, and a polarizing sheet 201 which are arrayed in this order in the direction away from the liquid crystal material 209.

A number of spacers 206 of glass or a resin are dispersed in the liquid crystal material 209 to maintain the spacing between the two glass substrates 202 constant.

Figure 6:
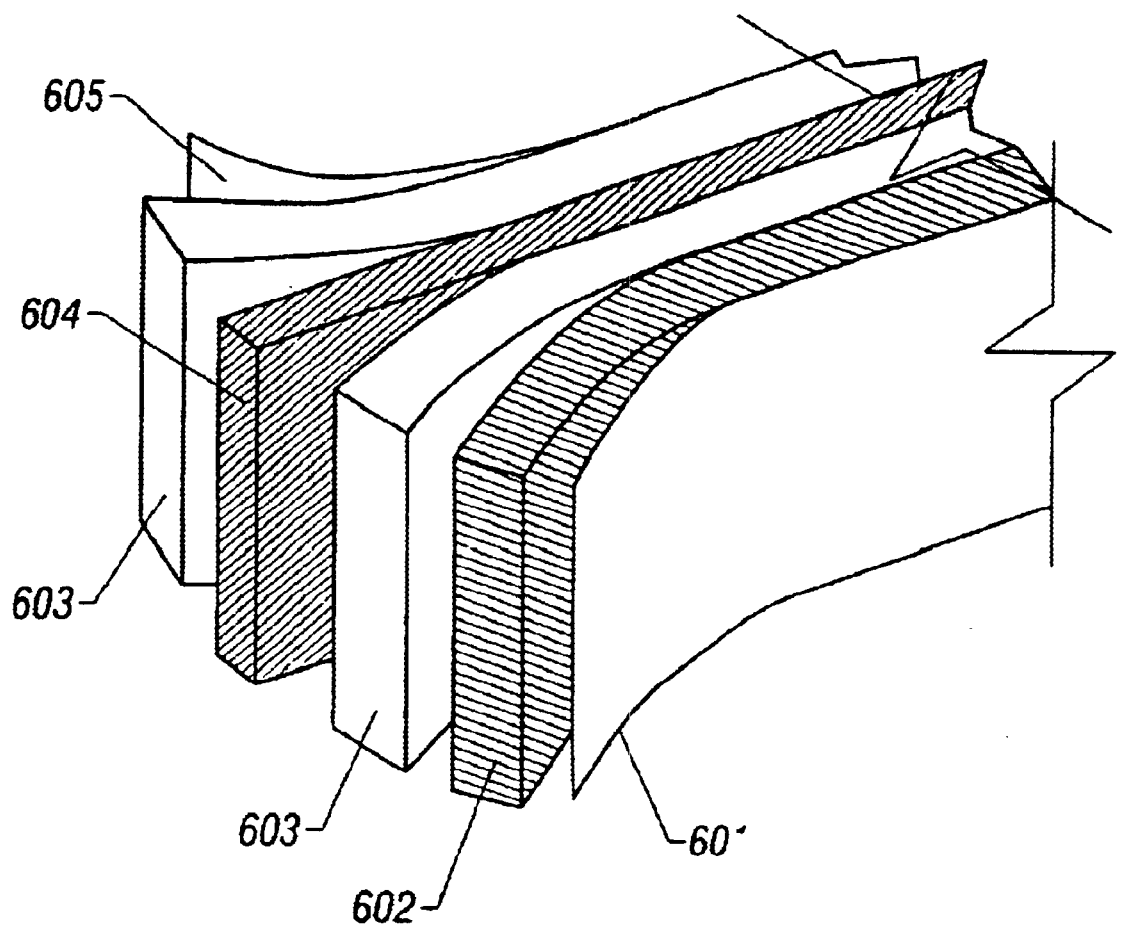
FIG. 6 is a fragmentary perspective view of polarizing sheets.

The polarizing sheet 201 is a filter for limiting the direction of vibration of light transmitted through the sheet 201. The thickness of this polarizing sheet 201 is about 80 to 210 μm. The structure of the polarizing sheet 201 is shown in FIG. 6. This polarizing sheet 201 has a polarizing film 604 of PVA (polyvinyl alcohol) in the center. Protective layers 603 of a cellulose-based material are attached to the polarizing film. Attached to the outer side of the protective film closer to the liquid crystal material are a pressure-sensitive adhesive sheet 602 and a mold release film 601. Attached to the outer side of the other protective film is a protective film 605 for protecting the surface. In use, the mold release film 601 is peeled off, and the pressure-sensitive adhesive sheet 602 is stuck on the glass substrate. The role of the orientation film 205 is to put the liquid crystal molecules in grooves formed in the orientation film 205 and to orient them in a given direction when the voltage is OFF. The orientation film is prepared by dissolving 5–10% by weight of polyimide or polyamide acid in a solvent. The thickness of the orientation film 205 is about 0.05 to 0.1 μm and required to be uniform.

The liquid crystal material 209 is located exactly in the center of the active matrix display. When the voltage is ON, the molecules of the liquid crystal material stand upright. The molecules are twisted when the voltage is OFF. In this way, the liquid crystal material acts as a switch for controlling passage of light, i.e., the light is passed or blocked. The liquid crystal material 209 is made of benzene, toluene, or other material.

The color filters 203 are color synthesis filters for converting monochrome liquid crystal display into color display. The color filters 203 comprise filters of red, green, and blue (RGB) colors, respectively. One pixel TFT overlaps one color of the color filters 203.

The sealing material 210 acts as an adhesive for bonding together the two glass substrates. The sealing material 210 can be made from silicon, acrylics, epoxies, and other materials.

The pixel TFTs are located in the liquid crystal region, in the same way as in the prior art active matrix display. The present invention is characterized in that the TFTs 208 of the driver circuit are positioned within the sealed-in liquid crystal material region. In the past, the TFTs of the driver circuit have been located outside the sealed-in liquid crystal material. The incorporation of the driver circuit into the sealed-in liquid crystal material region produces the following advantages: (1) the contamination resistance is improved; (2) the signal lines connected with the pixels are shortened, thus improving the image quality; and (3) the liquid crystal material serves as a shock-absorbing material, suppressing application of unwanted stress to the TFTs.

In the present example, the driver circuit is incorporated in the sealed-in liquid crystal region. Furthermore, the integrated circuit 211 such as a microprocessor for controlling the driver circuit is incorporated in the sealing material 210. This reduces the distance between the driver circuit and the controlling integrated circuit. As a result, introduction of unwanted noise in the signal is reduced, and other advantages are obtained.

Where the controlling integrated circuit is sealed, it can be easily mounted by reducing the thickness of a part of the opposite glass substrate, or counter substrate, 202. Because the controlling integrated circuit 211 is enclosed in the sealed-in region, the reliability is made higher compared with the prior art structure. The control circuit referred to herein is an integrated circuit built, using a wafer of single-crystal silicon. Examples of this control circuit include memories, I/O ports, various other control circuits, circuits for handling video signals, and integrated circuits comprising any combinations thereof. Of course, the required number of these integrated circuits are installed.

Preferably, the integrated circuit is mounted on the substrate by COG (chip on glass) mounting techniques. However, if electrical connections are made by wire bonding, the interconnections are substantially sealed by the sealing material. Therefore, high reliability is secured.

A shielding film (not shown) made from chromium, aluminum, or the like is required to be formed on the top surface of the peripheral driver circuit region.

In the configuration shown in FIG. 2, a part of the glass substrate 202 is thinned, and the integrated circuit 211 is positioned in this thinned portion, because the integrated circuit 211 is as thick as hundreds of micrometers, while the gap in which the liquid crystal material is injected is on the order of micrometers. In the structure shown in FIG. 2, a part of the top glass substrate 202 is thinned. Instead, a part of the glass substrate 202 on which the TFTs are packed may be thinned. Alternatively, both glass substrates 202 may have thinned portions in which the integrated circuit 211 is mounted.

The process sequence for fabricating the active matrix circuit of the present invention is described by referring to FIGS. 5(A)–5(E). The left side of each figure illustrates the process sequence for fabricating TFTs of the peripheral driver circuit. The right side of each figure illustrates the process sequence for fabricating TFTs of the active matrix circuit. First, a silicon oxide film is formed as a buffer oxide film 502 to a thickness of 1000 to 3000 Å on a substrate 501 of quartz or glass by sputtering or plasma-assisted CVD (PCVD) in an oxygen ambient.

Then, an amorphous or polycrystalline silicon film is formed to a thickness of 300 to 1500 Å, preferably 500 to 1000 Å, by PCVD or LPCVD. The laminate is thermally annealed at a temperature higher than 500° C., preferably 800 to 950° C., to crystallize the silicon film. This crystallization step may be followed by photo-annealing to enhance the crystallinity further. During the crystallization making use of thermal annealing, a catalytic element such as nickel for promoting crystallization of silicon may be added, as described in Japanese Patent Laid-Open Nos. 244103/1994 and 244104/1994.

Thereafter, the silicon film is etched to form island-like active layers 503 (for P-channel TFTs) and 504 (for N-channel TFTs) for forming a peripheral driver circuit and an active layer 505 for TFTs (pixel TFTs) forming a matrix circuit. Subsequently, a gate-insulating film 506 of silicon oxide is formed to a thickness of 500 to 2000 Å by sputtering in an oxygen ambient. The gate-insulating film 506 may be formed by plasma-assisted CVD. Where the silicon oxide film is formed by plasma-assisted CVD, it is desired to use nitrous oxide (nitrogen monoxide) ($N_2O$) as a raw material gas. Alternatively, oxygen and monosilane ($SiH_4$) may be used.

Then, a polysilicon film containing a trace amount of phosphorus to enhance the conductivity is formed to a thickness of 2000 Å to 5 $\mu$m, preferably 2000 to 6000 Å, by LPCVD over the whole surface of the laminate. The laminate is then etched to form gate electrodes 507, 508, and 509 (FIG. 5(A)).

Phosphorus is introduced into all the islands of the active layers 503–505, using the gate electrodes 507–509 as a mask, by a self-aligned ion doping process. At this time, phosphine ($PH_3$) is used as a dopant gas. The dose is $1\times10^{12}$ to $5\times10^{13}$ atoms/cm$^2$. As a result, lightly doped N-type regions 510, 511, and 512 are formed (FIG. 5(B)).

Then, a photoresist mask 513 which covers the active layer 503 of the P-channel TFTs and a photoresist mask 514 extending parallel to the gate electrode 509 are formed. The mask 514 covers the active layer 505 of the pixel TFTs up to the portion spaced 3 $\mu$m from the end of the gate electrode 509. Again, phosphorus is introduced by ion doping techniques, using phosphine as a dopant gas. The dose is $1\times10^{14}$ to $5\times10^{15}$ atoms/cm$^2$. As a result, heavily doped N-type regions (source/drain) 515 and 516 are formed. At this time, no phosphorus is implanted into that region 517 of the lightly doped N-type region 512 of the pixel TFT active layer 505 which is covered with the mask 514. Therefore, the region 517 remains lightly doped N-type (FIG. 5(C)).

Then, active layers (504, 505) forming the N-channel TFTs are coated with a photoresist mask 518. Using diborane ($B_2H_6$) as a dopant gas, boron ions are introduced into the active layer 503 by ion doping techniques. The dose is $5\times10^{14}$ to $8\times10^{15}$ atoms/cm$^2$. In this doping process, the dose of boron is greater than that of phosphorus used in the step of FIG. 5(C) and so the previously formed, lightly doped N-type region 510 changes into a heavily doped P-type region 519. As a result of these doping steps, heavily doped N-type regions (source/drain) 515, 516, heavily doped P-type regions (source/drain) 519, and a lightly doped N-type region 517 are formed. In the present example, the width x of the lightly doped region 517 is about 3 $\mu$m (FIG. 5(D)).

Thereafter, the laminate is thermally annealed at 450–850° C. for 0.5 to 3 hours to repair the damage created by the implantation. The dopant is activated, and the crystallinity of the silicon is recovered. Then, a silicon oxide film is formed as an interlayer dielectric 520 over the whole surface to a thickness of 3000 to 6000 Å by PCVD. This can be either a film of silicon nitride or a multilayer film of silicon oxide and silicon nitride films. The interlayer dielectric 520 is etched by a wet-etching process to create contact holes in the source/drain regions.

Then, a titanium film having a thickness of 2000 to 6000 Å is formed by sputtering. This film is etched to form electrodes and interconnects (521, 522, 523) for a peripheral driver circuit and electrodes and interconnects (524 and 525) for pixel TFTs. A silicon nitride film 526 having a thickness of 1000 to 3000 Å is formed as a passivation film by PCVD. This passivation film is etched to form contact holes extending to the electrodes 525 of the pixel TFTs. Finally, an ITO (indium-tin oxide) film formed by sputtering and having a thickness of 500 to 1500 Å is etched to form pixel electrodes 527. In this way, a peripheral logic circuit and an active matrix circuit are formed integrally (FIG. 5(E)).

The active matrix display of the present example is assembled in the manner described below.

Various chemicals used for surface treatments such as etchants and resist release liquid are sufficiently cleaned up from the TFT substrates and from the color filter substrate.

Then, the orientation films are made to adhere to the color filter substrate and the TFT substrate, respectively. Each orientation film is provided with given grooves. The liquid crystal molecules are oriented uniformly along the grooves. The orientation film is prepared by dissolving about 10% by weight of polyimide in a solvent such as butyl Cellosolve or n-methyl pyrrolidone. This is referred to as polyimide varnish and printed by flexo-printing equipment.

The orientation films adhering to the TFT substrate and the color filter substrate, respectively, are heated to cure them. This is referred to as baking. For this purpose, hot air having a maximum service temperature of about 300° C. is blown against the substrates so as to heat them. In this way, the polyimide varnish is baked and cured.

Then, a rubbing operation is performed. That is, the surfaces of the glass substrate to which the orientation films adhere are rubbed in a given direction with buff cloth (fibers of rayon, nylon, or the like) having filament lengths of 2 to 3 mm to form microscopic grooves.

Subsequently, spherical spacers of a polymer, glass, silica, or other material are dispersed either by a wet method or by a dry method. In the wet method, the spacers are mixed into a solvent such as pure water or an alcohol and the resulting mixture is dispersed onto the glass substrate. In the dry method, the spacers are dispersed, using no solvent at all.

Thereafter, a sealing material is applied to the outer frame of the TFT substrate to bond together the TFT substrate and the color filter substrate and to prevent the injected liquid crystal material from flowing out. The sealing material is prepared by dissolving an epoxy resin and a phenolic curing agent in ethyl Cellosolve, or solvent. After application of the sealing material, two glass substrates are bonded together by hot-pressing at around 160° C. The sealing material is cured in about 3 hours.

Finally, the liquid crystal material is introduced from the liquid crystal injection port formed in the active matrix display obtained by bonding together the TFT substrate and the color filter substrate. Then, the injection port is closed off with an epoxy resin. In this way, the active matrix display is assembled.

EXAMPLE 2

Figure 3:
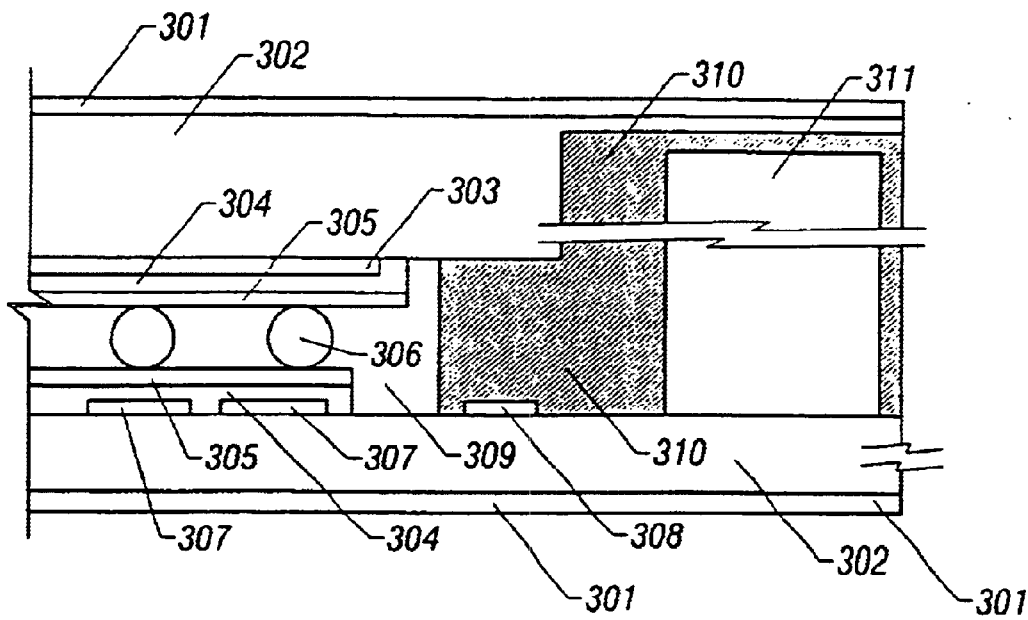
FIG. 3 is a cross-sectional view of an active matrix display according to Example 2 of the invention.
Figure 4:
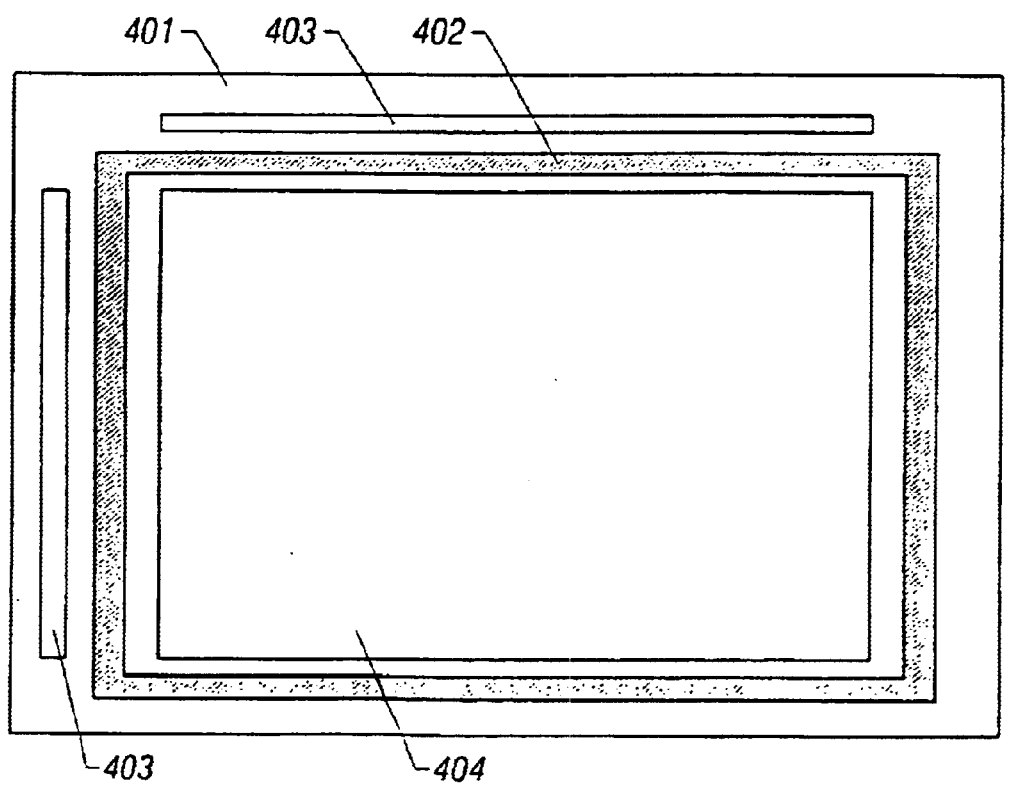
FIG. 4 is a schematic view of the prior art active matrix display.
Figure 5A:
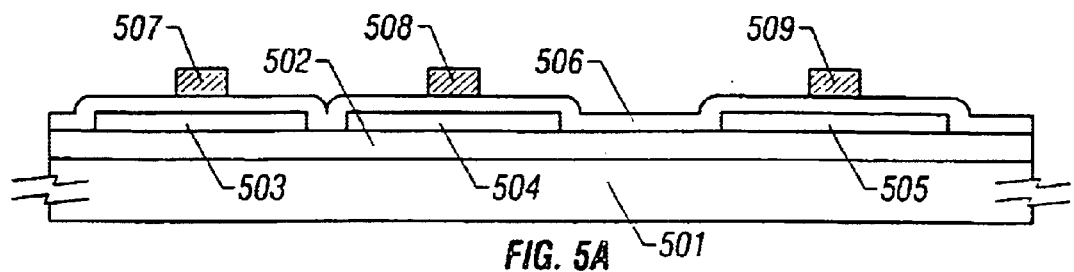
FIGS. 5(A)–5(E) are cross-sectional views of the active matrix display shown in FIG. 2, illustrating the process sequence for fabricating the display.
Figure 5B:
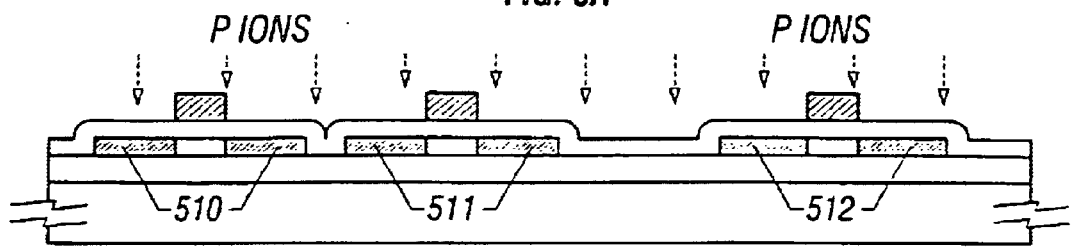
Figure 5C:
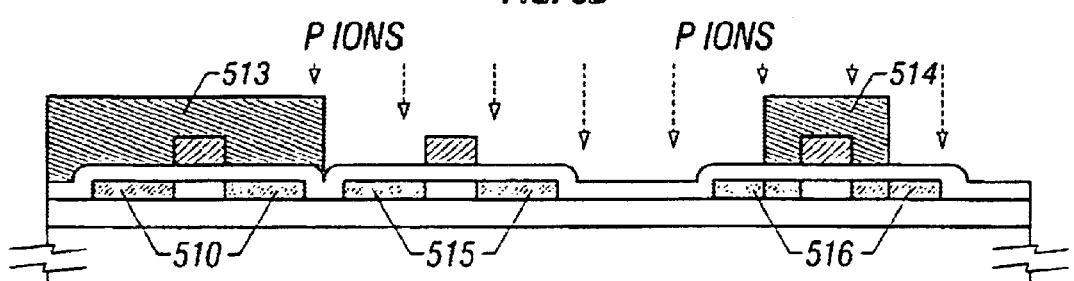
Figure 5D:
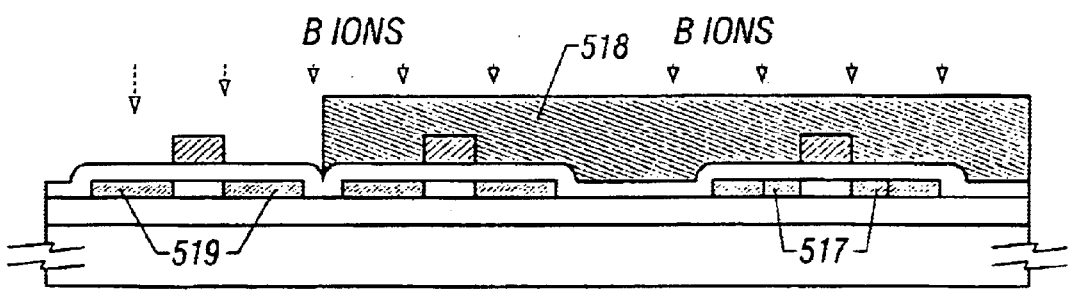
Figure 5E:
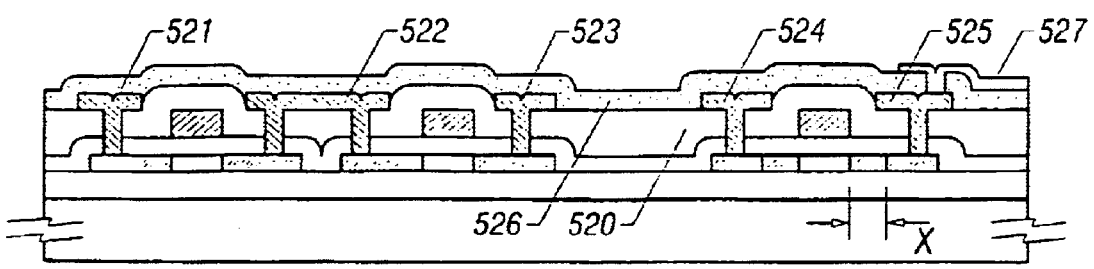

Another active matrix display according to the present invention is shown in FIG. 3 in cross section. As can be seen from this figure, a microprocessor 311 for controlling the active matrix display and TFTs 308 forming a driver circuit are sealed by a sealing material 310, thus protecting the driver circuit TFTs 308. The driver circuit TFTs 308 are prevented from being exposed. The present example is similar to Example 1 in structure and process sequence except for circuit elements (driver circuit TFTs 308) sealed by the sealing material 310.

EXAMPLE 3

Figure 7:
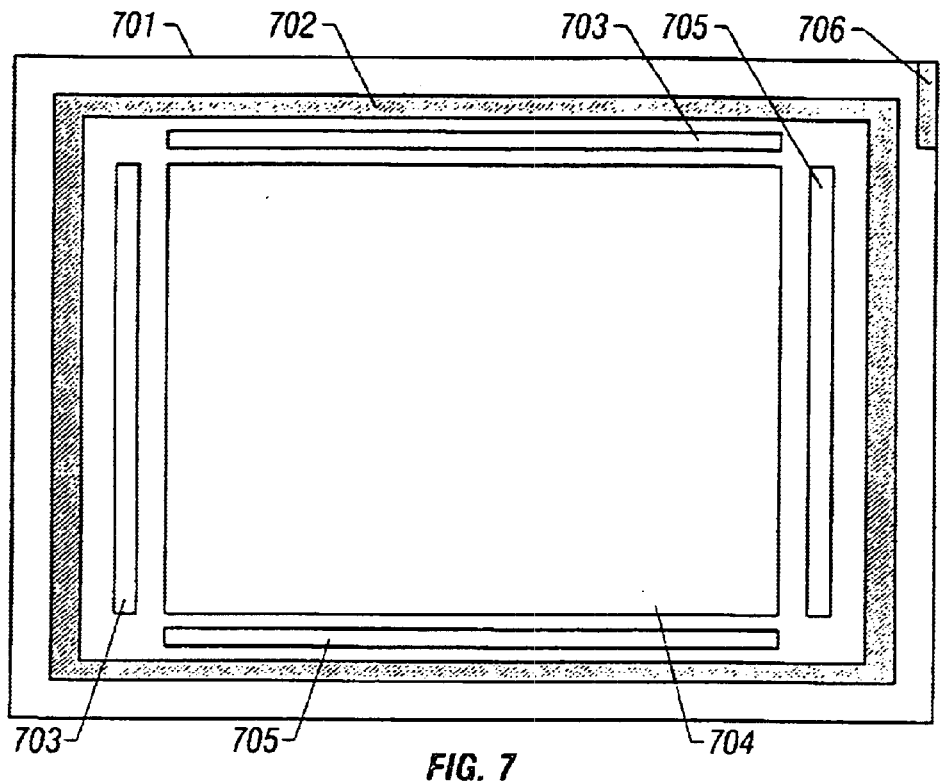
FIG. 7 is a schematic view of another active matrix display according to EXAMPLE 3 of the invention.

The present example pertains to a structure equipped with a preliminary peripheral circuit (redundant circuit). FIG. 7 is a schematic top view of a liquid crystal panel according to the present example. Since FIG. 7 is a view taken from the top, only one glass substrate 701 is shown. In practice, however, another glass substrate which makes a pair with the glass substrate 701 is bonded to the glass substrate 701. In the structure shown in FIG. 7, a peripheral driver circuit region 703 and a matrix pixel region 704 are located inside a sealing material 702. Since the inside of the sealing material 702 is filled with a liquid crystal material, the liquid crystal material exists on the top surfaces of the TFTs arranged in the peripheral driver circuit region 703 and in the pixel region 704.

An integrated circuit (IC) forming various control circuits connected with the peripheral driver circuit is positioned within the sealing material 702 and just molded in this sealing material 702.

Indicated by numeral 705 is a preliminary peripheral driver circuit, and is used when a peripheral driver circuit placed in the region 703 is at fault. Indicated by numeral 706 is a connector terminal for making a connection with the outside. Video signals and required signals are entered through this connector terminal 706. The liquid crystal panel shown in FIG. 7 incorporates every circuit necessary between a pair of glass substrates 701. Furthermore, every circuit is sealed either by the sealing material 702 or by the liquid crystal material. Hence, the reliability can be rendered quite high.

The width of the peripheral driver circuit is several millimeters, though it is not drawn to scale. The width of the sealing material is determined by the integrated circuit connected with the peripheral driver circuit, but the width can be reduced down to several millimeters or less. If the integrated circuit can be made small, the width can be set equal to about 1 mm. Accordingly, only a fringe of about several millimeters to 1 cm exists around a region which actually forms a liquid crystal display area. Furthermore, excluding the external output terminals, the device apparently consists only of a pair of glass substrates. In this way, the device has a quite simple appearance.

As described above, the TFTs of the driver circuit for the active matrix display are located inside the sealing material region. This can improve the temperature resistance and contamination resistance. Furthermore, the active matrix display can be miniaturized. In addition, the image signal lines can be shortened. This can reduce the voltage drop. Hence, the characteristics can be improved.

By positioning the peripheral driver circuit region in the region in which a liquid crystal material or a sealing material is located, the peripheral driver circuit is sealed by the liquid crystal material or by the sealing material. In consequence, the peripheral driver circuit is protected from moisture; otherwise the reliability would be deteriorated. Moreover, the liquid crystal material or sealing material serves as a shock-absorbing material and so application of unwanted stress to the peripheral driver circuit region can be prevented.

By placing the controlling integrated circuit connected with the peripheral driver circuit within the sealing material, the controlling integrated circuit is prevented from being adversely affected by moisture; otherwise the reliability would be impaired. Additionally, the requisite circuits can be inserted between a pair of glass substrates and, therefore, a miniaturized liquid crystal display having improved reliability and a simple appearance free from unwanted unevenness can be obtained.

EXAMPLE 4

Figure 8:
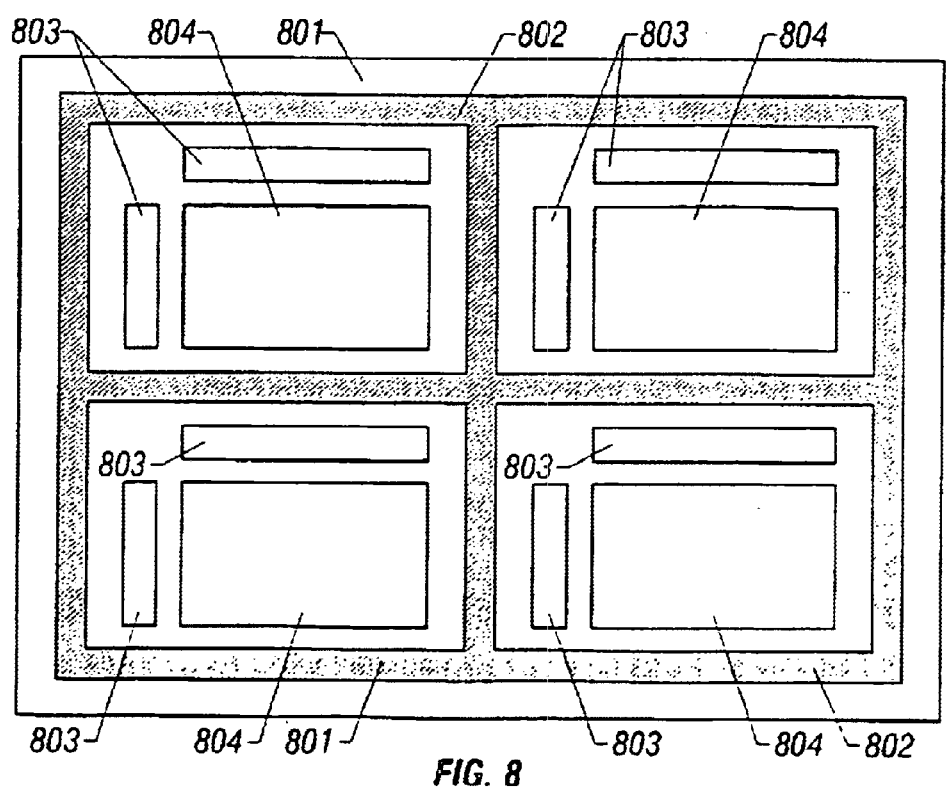
FIG. 8 is a schematic drawing showing an active matrix display according to Example 4 of the invention.

FIG. 8 shows an embodiment in which a single glass substrate 801 is constituted of four panels. The substrate shown in FIG. 8 is constituted of a peripheral drive circuit 803 and a pixel area 804 which are integrated on the same glass substrate. The pixel area 804 is constituted of at least one thin-film transistor which is connected to a pixel electrode arranged like a matrix.

In FIG. 8, only the glass substrate 801 on which each circuit is formed is shown, however, another glass substrate opposite to it is actually arranged. A counter electrode is arranged on the opposite glass substrate not shown.

Further, in the constitution shown in FIG. 8, the active matrix liquid display device is divided by sealing material 802 so as to realize a manufacturing of a plurality of active matrix liquid crystal display panels on a pair of glass substrates. With such a constitution, the productivity and the reliability can be simultaneously enhanced.

Figure 9:
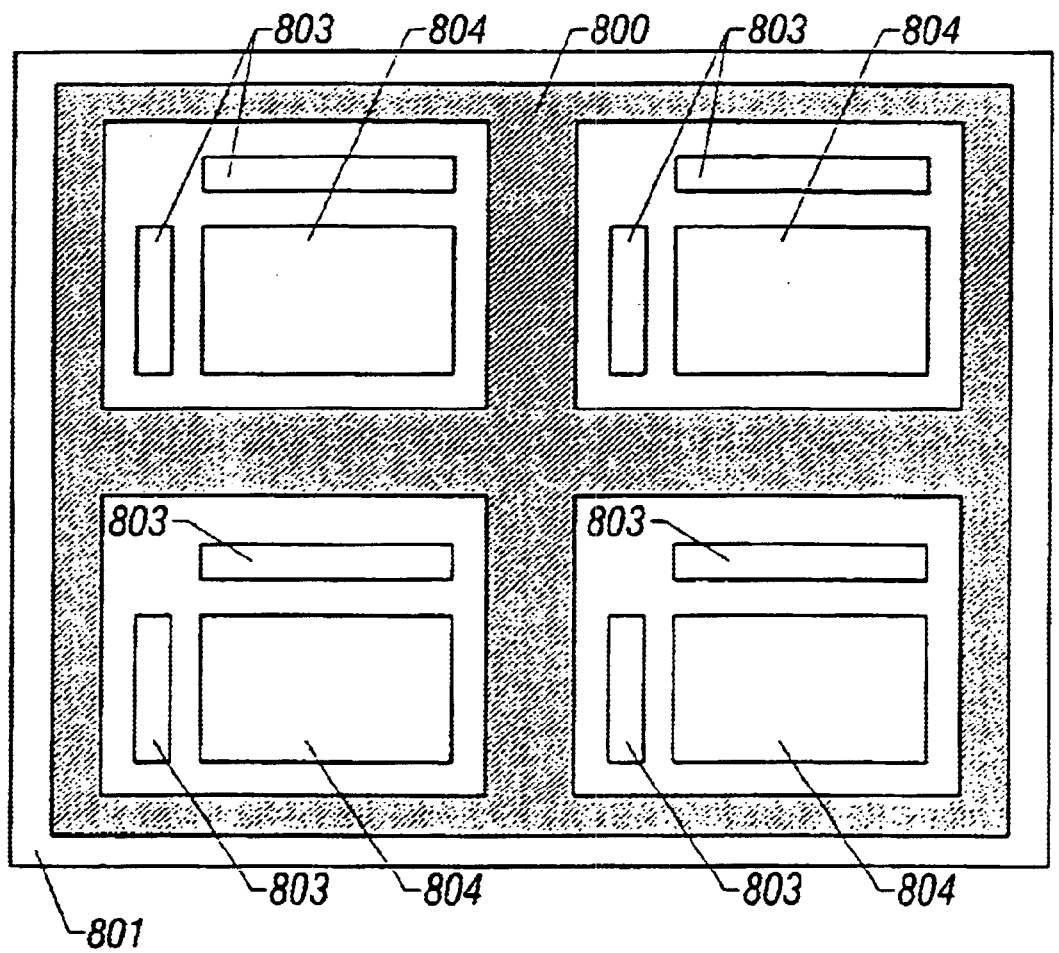
FIG. 9 is a cross sectional view showing an active matrix display according to Example 4 of the invention.

It should be noted that although the width of the sealing material 802 is equal in FIG. 8, it may be widened to provide a margin for cutting the glass substrate 802 in an area where it is cut. For example, as shown in FIG. 9, the width of the cross area of a sealing material 800 that divides liquid crystal display device may be approximately twice as wide as that of an edge area around the glass substrate 801. In FIG. 9, the same reference numeral as in FIG. 8 denotes the same member.

The assembly process of the active matrix liquid crystal display device according to this embodiment will be described below.

A variety of chemicals such as etch and a resist release agent used for surface treatment which are left on the thin-film transistor substrate and the color filter substrate are sufficiently cleaned.

Next, an orientation film is deposited on the color filter substrate and the thin-film transistor substrate. A fixed groove is carved on the orientation film and molecules of liquid crystal are evenly arranged along the groove. The material of the orientation film is made by dissolving polyimide equivalent to approximately 10 percents by weight of a solvent in the solvent such as butyl cellosolve and n-methyl pyrolidone. This solution is called polyimide varnish. The polyimide varnish is printed by a flexographic press.

The orientation film deposited on the thin-film transistor substrate and the color filter substrate is respectively heated to harden. This is called baking. Polyimide varnish is baked to harden by heating it with a hot blast up to approximately 300° C.

Next, the surface of the glass substrate on which the orientation film is deposited is rubbed in the fixed direction with a buff cloth made of rayon or nylon with pile 2 to 3 mm long and a rubbing step for forming a minute groove is implemented.

Polymer, glass or silica spherical spacers are scattered on either of the thin-film transistor substrate or the color filter substrate. As for the method for scattering spacers, a wet method by which spacers are mixed in a solvent such as pure water and alcohol and they are scattered on the glass substrate, and a dry method by which spacers are scattered without using a solvent are used.

Next, sealing material is applied to the outer frame of the thin-film transistor substrate. Sealing material is applied so as to stick the thin-film transistor substrate and the color filter substrate and to prevent injected liquid crystal from leaking outside. As for the material of sealing material, solution made by dissolving epoxy resin and a phenol hardening agent in a solvent of ethyl cellosolve is used. Two glass substrates are stuck after sealing material is applied. As for the method of sticking, a hot setting method by which sealing material is hardened in approximately three hours by pressing them at the temperature of approximately 160° C. is used.

A groove matched with the size of a panel is carved on the glass substrate with a scriber, and round urethane is dropped from over the groove of the substrate with pressure of an air cylinder of a breaker so as to divide the thin-film transistor substrate into the size of a panel and enable arrangement of multi panels.

Finally, liquid crystal is injected from an inlet for liquid crystal of the active matrix liquid crystal display device in which the thin-film transistor substrate and the color filter substrate are stuck, and after injection the inlet for liquid crystal is sealed with epoxy resin. According to the above-described steps, the active matrix liquid crystal display device is assembled.

A plurality of constitutions described above are manufactured on a pair of large-sized glass substrates, and the glass substrate is divided by sealing material as shown in FIG. 8. With such a method, a plurality of liquid crystal panels can be simultaneously formed.

EXAMPLE 5

The example present relates to a configuration in which a LCD panel also incorporates, in an integrated manner, a controller of a peripheral device.

According to the example, to provide an advanced version of, for instance, an active matrix liquid crystal display device, a controller circuit for a peripheral device is formed on the same glass substrate as an active matrix circuit. Thus, the entire device is made smaller, and the number of parts and the manufacturing cost are reduced.

Specifically, the example is characterized as follows. A controller circuit including a CPU is formed on the same substrate as an active matrix circuit such that the CPU can control an external device. Thus, the configuration of the invention serves as not merely a display but also a terminal for handling a variety of information.

The controller circuit includes, in addition to the CPU, a RAM, a ROM, and an I/O (peripheral controller). By forming these circuits on a glass or quartz substrate, or a substrate having a proper insulative surface using thin-film transistors, an intelligent liquid crystal panel that is highly versatile, i.e., accommodates a variety of purposes.

The controller circuits has the following basic configuration:

(1) A CPU consisting of an instruction decode section, an arithmetic section, an internal register section, and a pointer section that is constituted of at ROM or a RAM, for determining a total sequence.

(2) A ROM as a storage device (nonvolatile memory) for storing a sequence program.

(3) A RAM as a storage device (volatile memory) for storing preset data, control data, and calculation results.

(4) an I/O circuit as an interface for connecting between the above sequence control system and an external system, including:

a serial I/O (SIO) for performing serial communication according to a standard as represented by RS232C;

a interrupt control circuit (INT) for receiving an interrupt request from a peripheral device to the CPU;

a process I/O (PIO) for performing exchange of multi-bit data in a parallel manner, and performing transfer of control with the external device;

a conversion circuit (A/D) for accepting an analog signal coming from the external system after converting it into a digital signal;

a conversion circuit (D/A) for outputting digital signal values coming from the CPU after converting those into given analog levels;

an infrared light interface for receiving and transmitting an infrared signal; and a timer circuit for setting a given period and outputting intervals thereof, and a counter circuit for performing time-slot control by counting the above signals.

(5) A system control section for performing such processing as rendering the system in a stand-by state, or resetting or stopping the system.

(6) A timing generator for generating a reference timing signal for the entire controller circuit.

(Embodiment 1)

This embodiment is directed to a case where a controller circuit for a peripheral device is integrated on the same glass or quartz substrate as a liquid crystal display device section (i.e., liquid crystal panel), and a liquid crystal projector is constructed by using such a configuration.

FIGS. 10A–10D show general configurations of liquid crystal panels used in this embodiment. In each of the liquid crystal panels shown in FIGS. 10A–10C, a pixel area 1001, a peripheral driver circuit area 1002, and a controller section 1003 for performing various types of control are integrated on the same substrate.

Figure 10A:
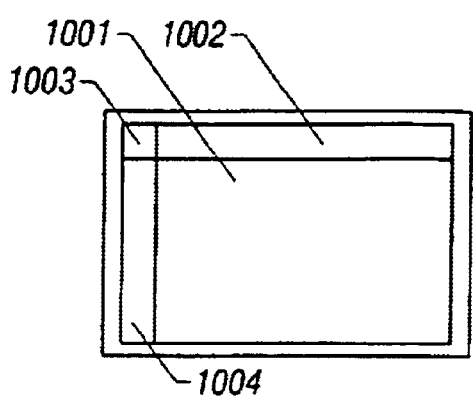
FIGS. 10A–10D show configurations of liquid crystal panels according to Example 5 of the invention.
Figure 10B:
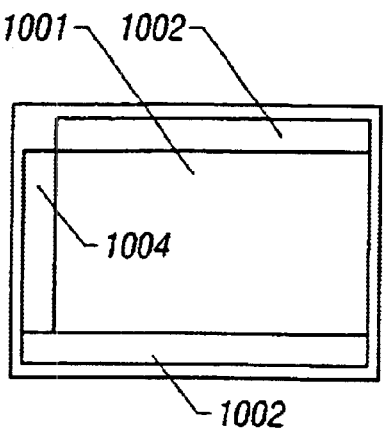
Figure 10C:
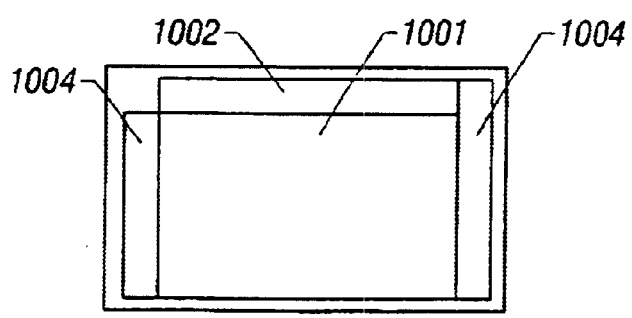
Figure 10D:
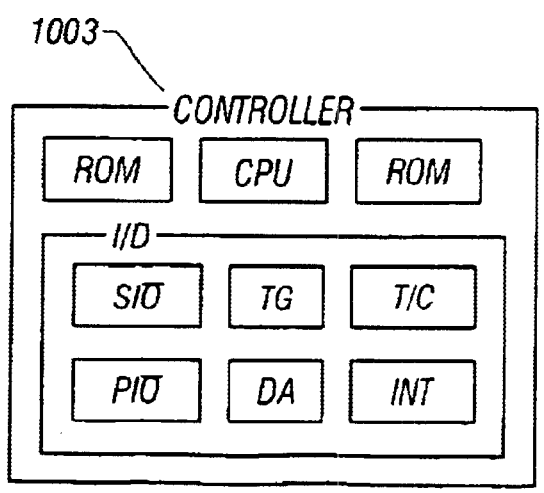

More specifically, each of the liquid crystal panels shown in FIGS. 10A–10C has an active matrix area (pixel area) 1001, a horizontal scanning driver circuit 1002 and a vertical scanning driver circuit 1004 that drive the active matrix area 1001, and a controller 1003.

The liquid crystal panels of FIGS. 10A–10D are characterized in that the above circuits are integrated on the same glass or quartz substrate or substrate having a proper insulative surface.

FIGS. 10A–10C show various layouts of the above circuits.

In FIG. 10A, the controller 1003 comprises ROM, CPU, SIQ, TG, T/C, PIQ, DA and INT.

The ROM represents a read-only-memory. The CPU represents a central processing unit. The SIQ represents a serial I/O. The TG represents a timing generator. The T/C represents a timer/counter. The PIQ represents a parallel I/O. The D/A represents D/A converter. The INT represents an interrupt controller.

Figure 14:
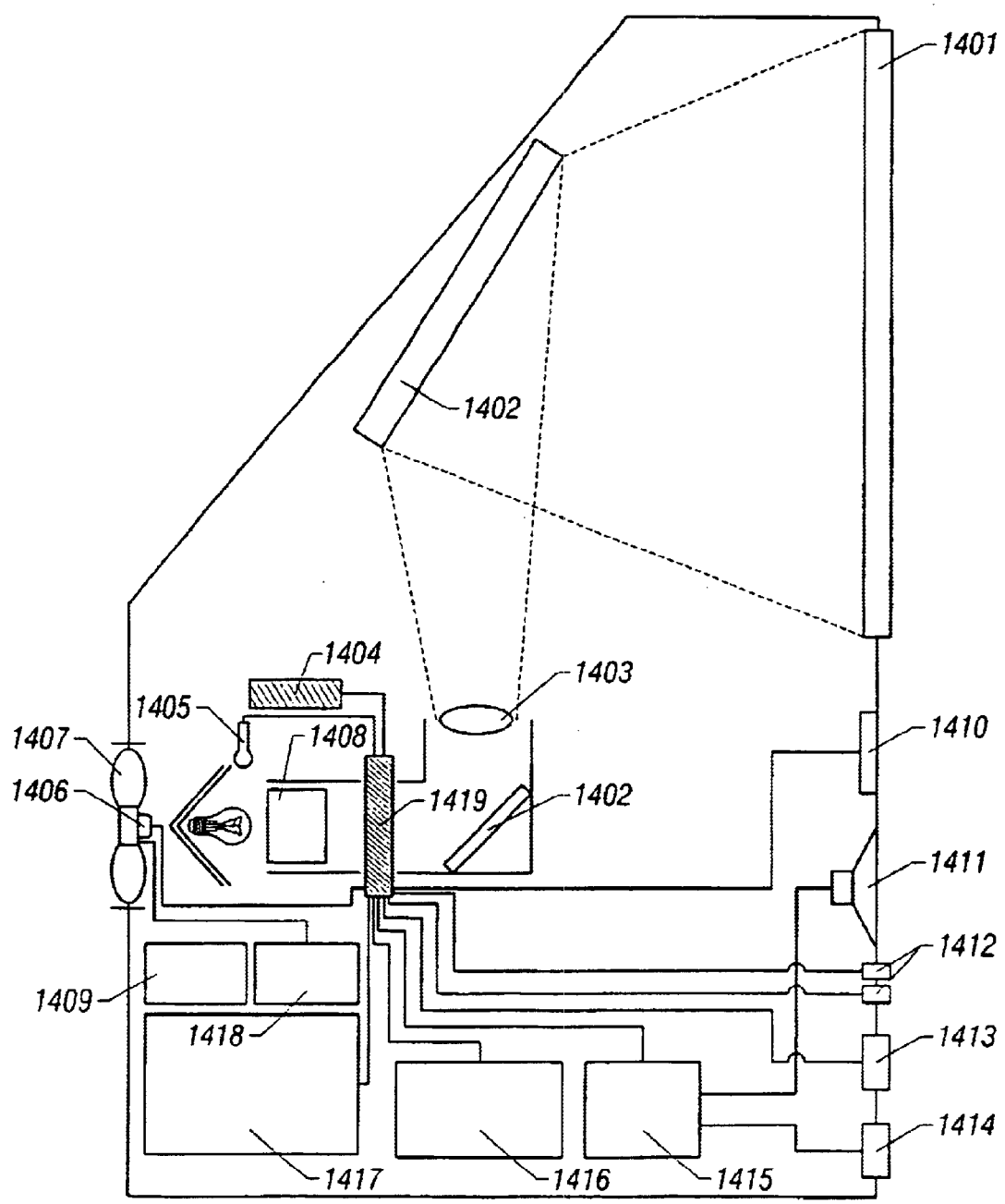
FIG. 14 shows a general configuration of a liquid crystal projector.

FIG. 14 shows a general configuration of a projection type liquid crystal display apparatus using the above liquid crystal panel.

In FIG. 14, the reference numeral 1401 represents a screen. The reference numeral 1402 represents a mirror. The reference numeral 1403 represents a projection lens. The reference numeral 1404 represents a smoke sensor. The reference numeral 1405 represents a temperature sensor. The reference numeral 1406 represents a fan sensor. The reference numeral 1407 represents a fan. The reference numeral 1408 represents an optics. The reference numeral 1409 represents a RS232C connector. The reference numeral 1410 represents an infrared sensor.

The reference numeral 1411 represents a speaker. The reference numeral 1412 represents a LED. The reference numeral 1413 represents a switch. The reference numeral 1414 represents a volume. The reference numeral 1415 represents a volume control circuit. The reference numeral 1416 represents a liquid crystal video display circuit. The reference numeral 1417 represents a main power supply. The reference numeral 1418 represents a fan control circuit. The reference numeral 1419 represents a liquid crystal panel.

The configuration of FIG. 14 is characterized in that the wind amount of a cooling fan 1407 is controlled by a controller 1003 (FIG. 10) that is integrated in the liquid crystal panel 1419.

More specifically, an ambient temperature is measured by a temperature sensor 1405, and measured data is processed by the controller 1003. The controller 1003 controls the wind amount of the cooling fan 1407 based on a content of the processing.

This configuration can minimize noise of the fan 1407. Since the controller 1003 for controlling the fan 1407 is integrated in the modularized liquid crystal panel 1419, it is not necessary to add a new controller circuit.

Therefore the configuration of the apparatus can be simplified, which is very effective in reducing its manufacturing cost. Particularly in the case of producing an apparatus having various combinations of different functions, the above configuration is very advantageous because it increases the number of common parts.

In the configuration of FIG. 14, the power 1417 is forcibly shut down when smoke is detected by a smoke sensor 1404. This provides a function of preventing a fire originating from the inside of the apparatus.

The apparatus of FIG. 14 also has a photodetecting section, i.e., an infrared sensor 1410 to enable various external operations such as a volume operation by use of a remote controller.

Further, an RS232C connector 1409 is provided to allow access from external systems such as a personal computer. In addition, operation statuses of the apparatus are indicated by LEDs 1412 or the like.

Figure 11:
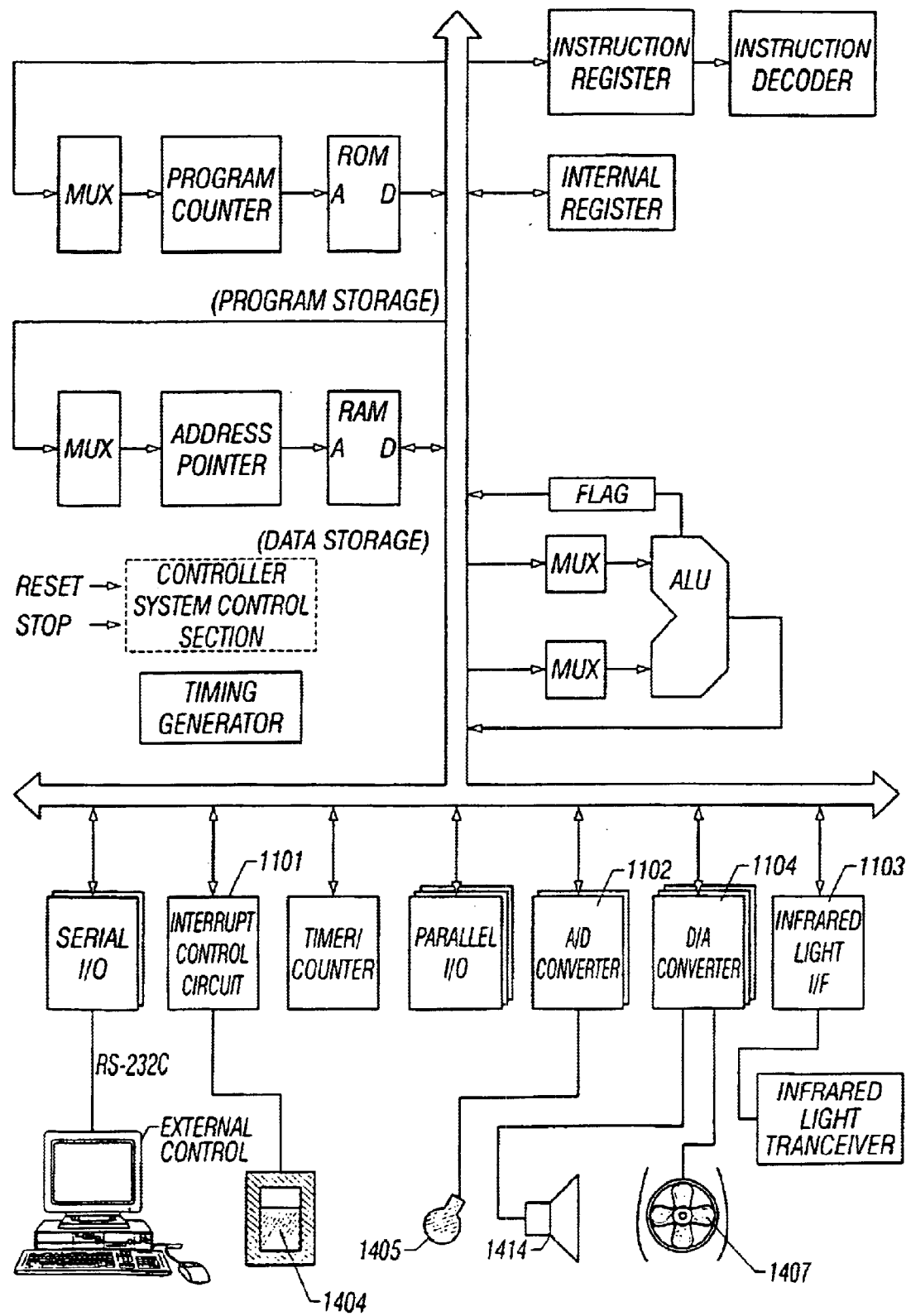
FIG. 11 is a block diagram showing a configuration of a peripheral circuit controller.
Figure 12:
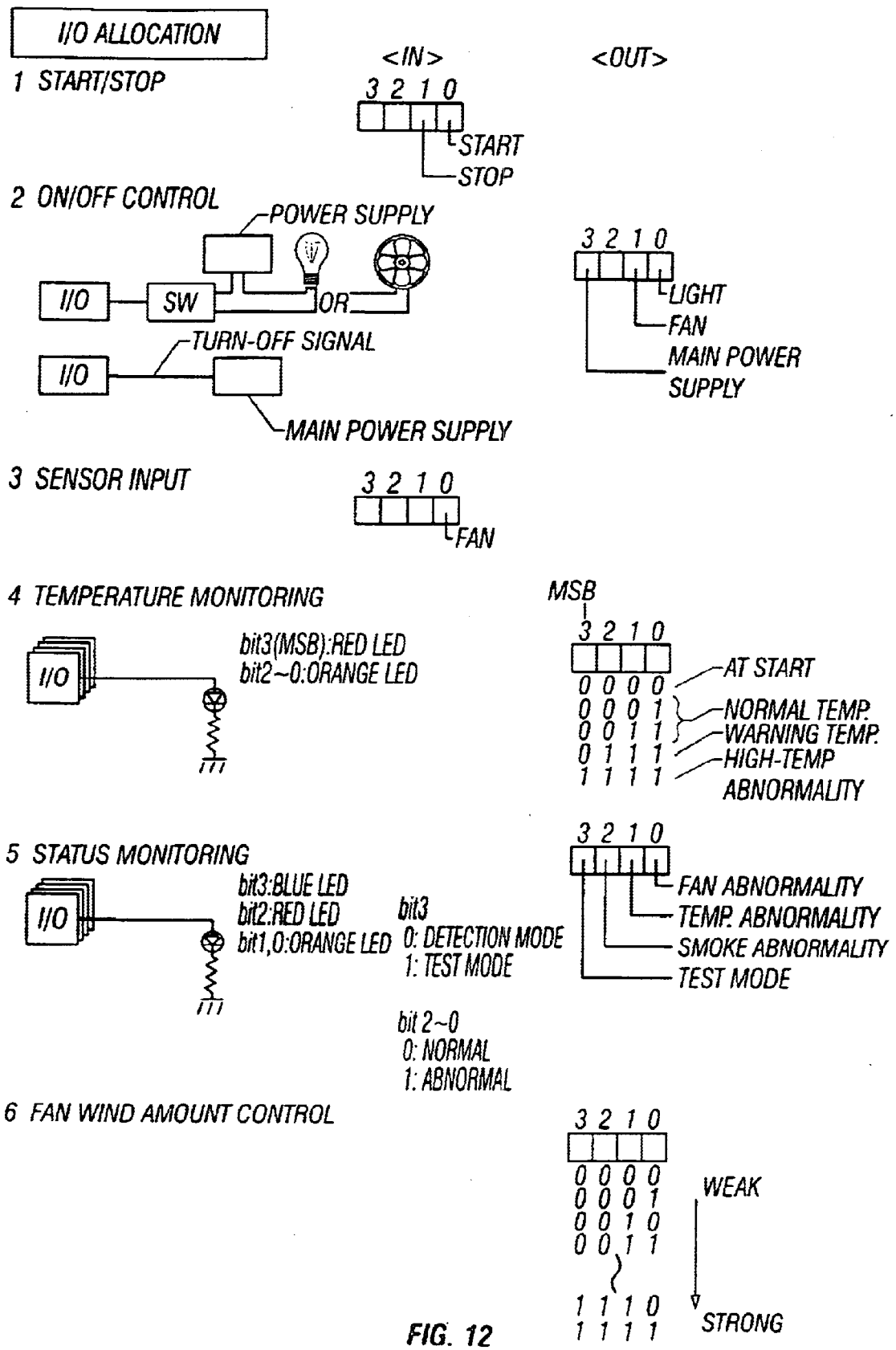
FIG. 12 shows a configuration of an I/O section and an example of bit allocation.

FIG. 11 is a block diagram showing a configuration of a peripheral circuit controller 1003 that realizes the above functions. FIG. 12 shows a configuration of an I/O section and an example of bit allocation.

To effect operation, an RS232C cable is connected to an external connector of a serial port.

The smoke sensor 1404 is constantly monitored by a CPU via an interrupt control circuit 1101. The CPU shuts of the main power 1417 upon reception of a signal from the smoke sensor 1404. The temperature sensor 1405 is connected to the CPU via an A/D converter 1102, and the CPU controls the wind amount of the fan 1407 and its operation start time and end time based on the ambient temperature.

To enable volume control from an infrared remote controller or the like, the infrared light detector is provided and connected to an infrared light interface 1103. The volume control is performed through a D/A converter 1104.

The I/O section operates as follows:

(1) Start/stop

Start is set by turning on a main power supply 1417 with a switch 1413, or by a start request sent from the remote controller. The controller then performs a series of sequence control operations.

(2) On/off control

The I/O section controls turning on/off of a power supply 1417 of a light source lamp of the projector and a power supply of the cooling fan 1407, and forcibly turns off the projector main power supply 1417.

(3) Sensor input

The I/O section sends the CPU a signal indicating that there is no wire breaking in the fan 1407, and a signal indicating that the fan 1407 is rotating.

(4) Temperature monitoring

Making a judgment based on a signal sent from the temperature sensor 1405, the CPU sends the I/O section a temperature level signal for monitor display.

(5) Status monitoring

Making a judgment based on signals indicating statuses sent from the respective sensors, the CPU monitors occurrence of abnormality. The I/O section is also used for test mode display at the time of testing the respective sensors etc.

(6) Fan wind amount control

The I/O section outputs a signal that allows control of the fan wind amount in 16 steps. For certain types of fans, a signal may directly be output from the D/A converter 1104 as shown in FIG. 11.

Figure 13:
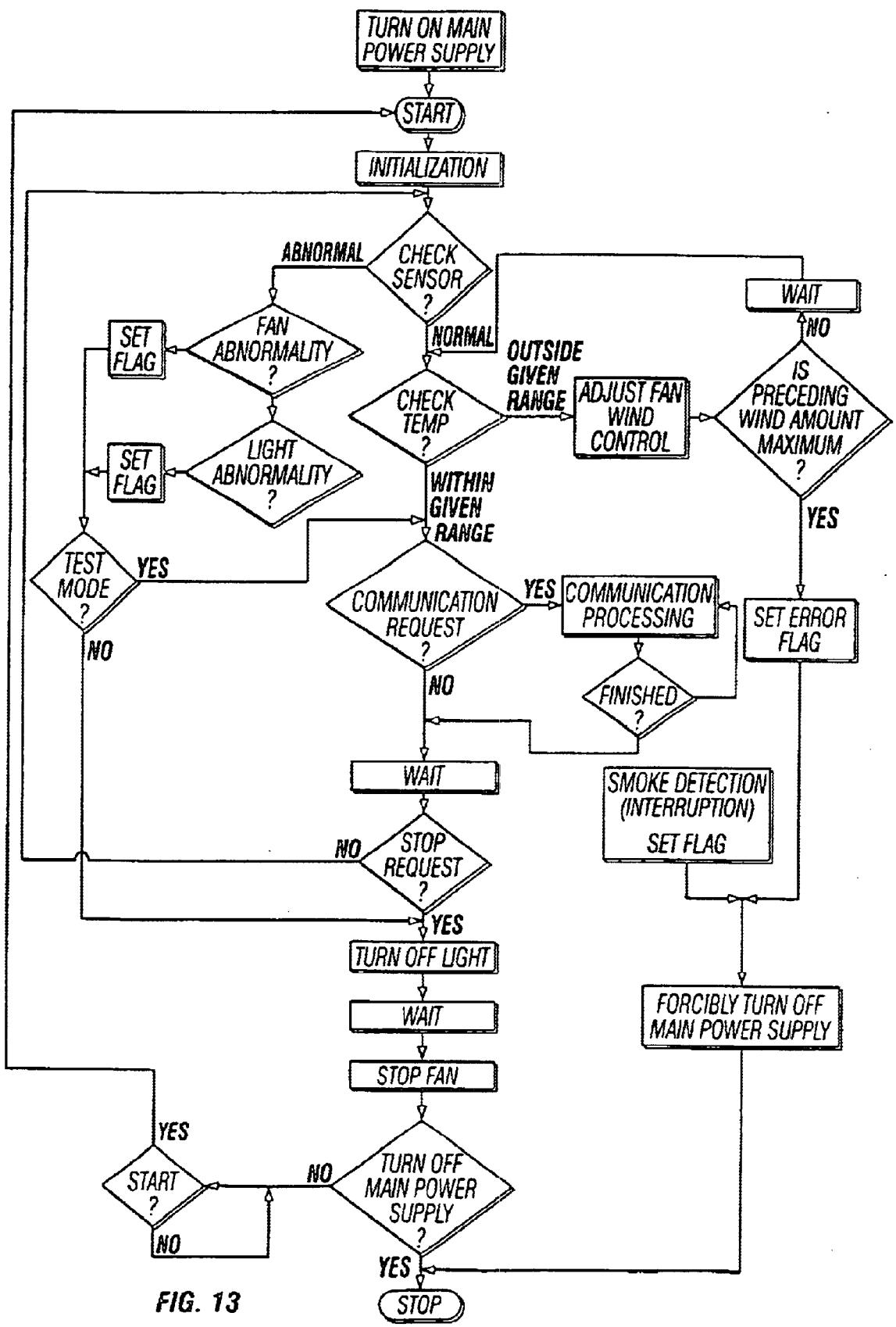
FIG. 13 shows an operation sequence.

A description will now be made of an operation sequence, which is shown in FIG. 13. Upon turning on of the main power supply 1417, the controller starts to execute the sequence. First the controller performs initialization, i.e., sets necessary parameters, and then checks statuses of the respective sensors.

If abnormality is found in the fan sensor 1406 or the light source lamp, the light source lamp is turned off and an abnormality flag is set. The power supply of the fan 1407 is also turned off.

If abnormality is not found in any sensor, the controller performs a temperature check and then performs adjustments of the fan such as an adjustment of the wind amount, and starting or stopping it.

If the temperature is not within a given range, these adjustments are continued in accordance with the operation status. However, an error flag is set and the fan is forcibly stopped by turning off the main power supply 1417 when it is judged that the temperature is too high and the fan 1407 is uncontrollable with the control including the above adjustments, or when the temperature of the light source does not increase even after a lapse of a predetermined time.

If the temperature is within the given range, the controller judges of reception of a communication request. If there is a communication request, the controller sets a prescribed communication time and performs communication processing. Examples of the communication content are reading of a status flag, and external setting of a test mode, a volume level, etc.

After completion of the communication, or when there is no communication request, the controller judges of reception of a stop request. If there is no stop request, the process returns to the sequence of checking the statuses of the respective sensors and the above operations are repeated.

A flag indicating smoke detection by the smoke sensor 1404 can always be set by an interruption, and is checked constantly in each sequence.

Upon detection of smoke, the main power supply 1417 is forcibly turned off to stop the apparatus. Although flags respectively indicating a temperature abnormality and a smoke detection are invalidated by turning off the main power supply 1417, indication of such abnormalities is continued for a long time by using capacitors in the display section.

While the fan sensor 1406 and the light source lamp sensor are tested, the process does not enter the stop sequence but a predetermined loop is executed.

As described above, this embodiment allows the controller, which is integrated in the liquid crystal panel, to control the entire apparatus. The contents of the control are not limited to those described above, but may be other ones.

This embodiment can attain simplification of the configuration of the entire display apparatus as well as increase of the number of functions, which were contradictory subjects conventionally.

(Embodiment 2)

Figure 15:
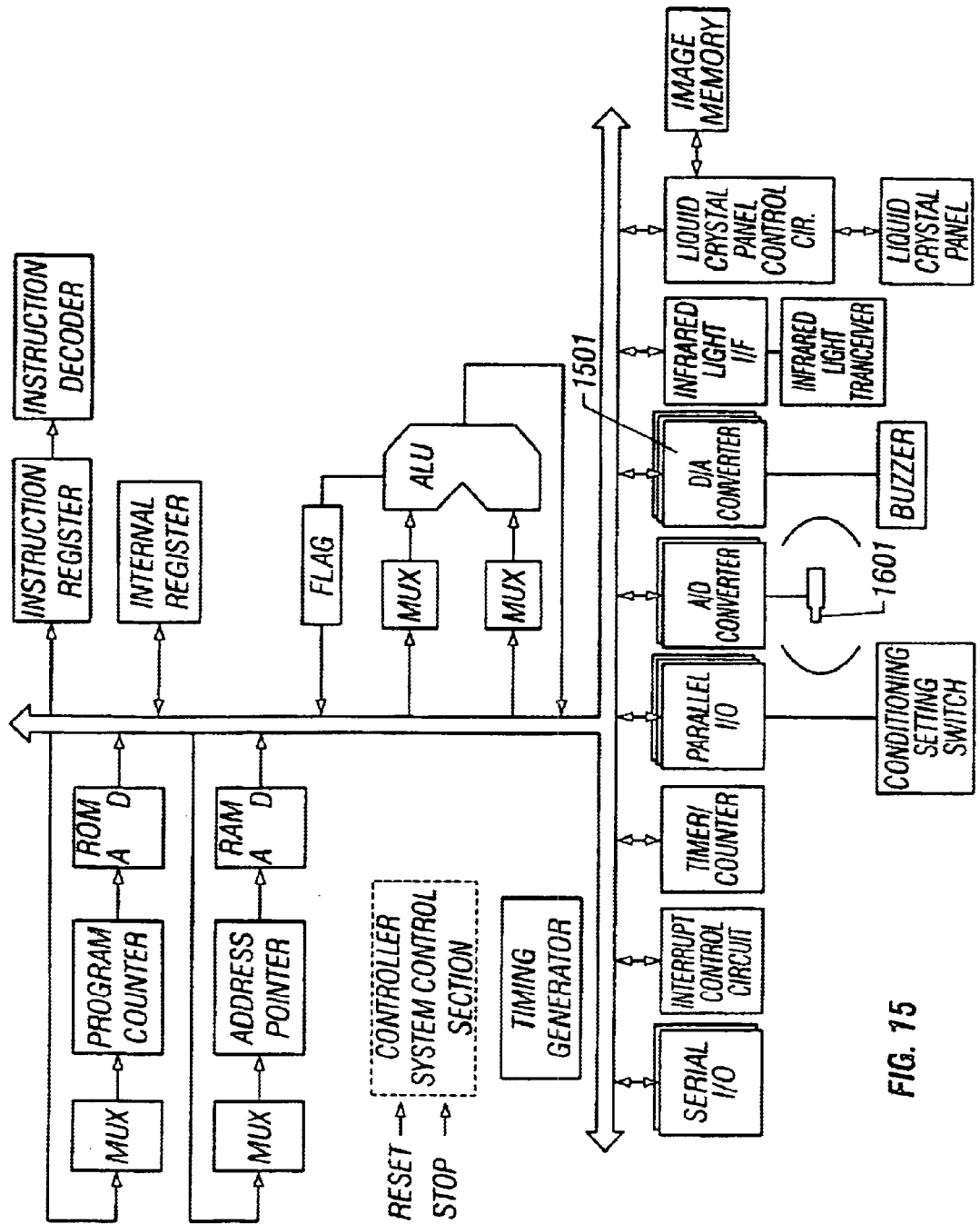
FIG. 15 is a block diagram showing a configuration of a peripheral circuit controller.
Figure 16:
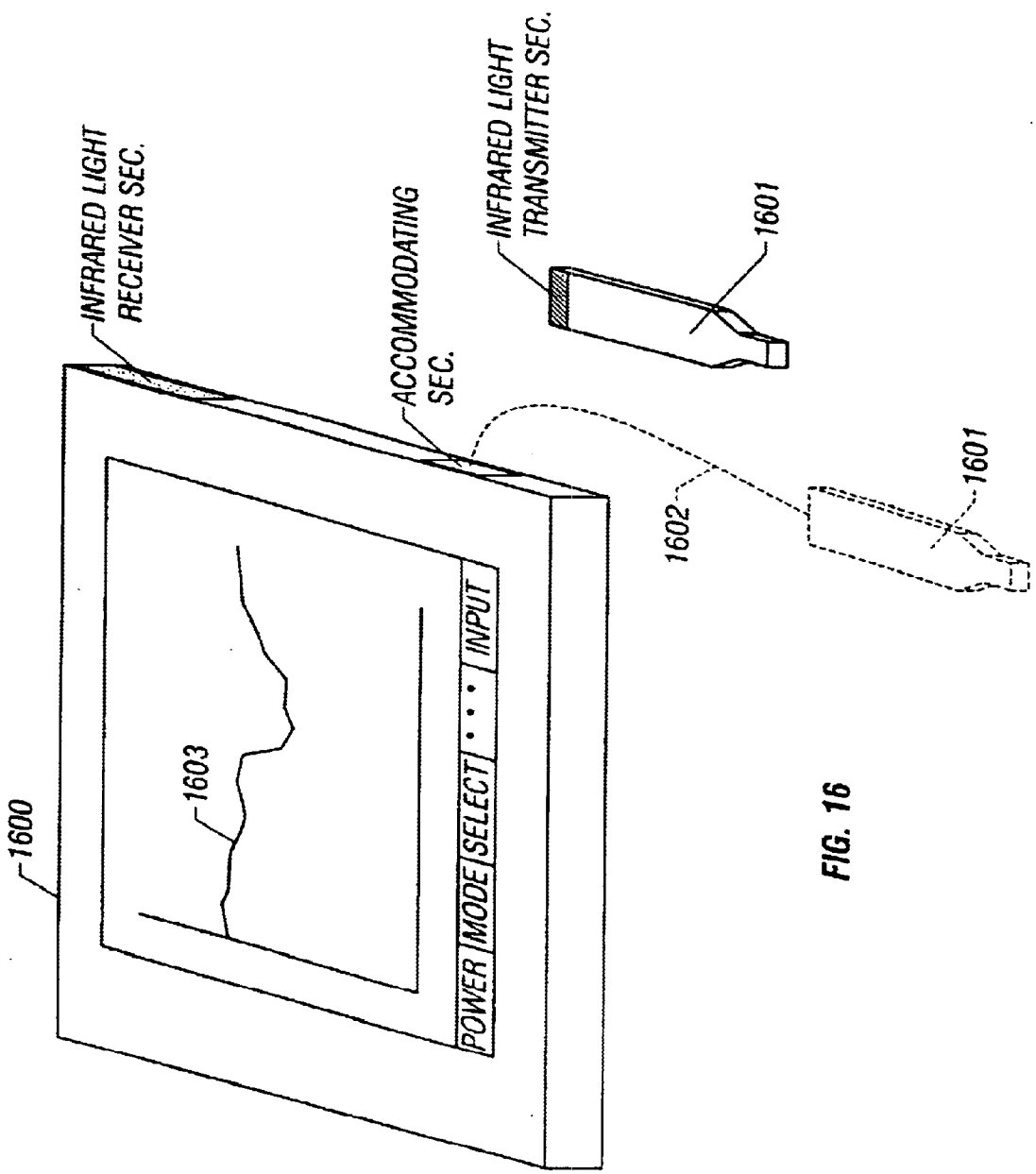
FIG. 16 shows a general configuration of a portable apparatus using a liquid crystal display device.

FIG. 15 is a block diagram showing a configuration of this embodiment. FIG. 16 shows a general configuration of a thin, portable apparatus using an active matrix liquid crystal display device. In this embodiment, this apparatus is used for health management.

Also in this embodiment, a controller for performing various kinds of control is incorporated, i.e., integrated in a liquid crystal panel 1600.

In this embodiment, a temperature sensor 1601 is provided to perform a body temperature measurement. The temperature sensor 1601 may be connected to the main body 1600 by a lead-out cable 1602. Alternatively, a cordless configuration may be employed.

In the case of using a lead-out cable 1602, it is connected to an A/D converter 1501 of the controller. In the case of the cordless configuration, a sensor section 1601 is coupled to the main body 1600 through an infrared signal or the like.

Further, the apparatus is so designed as to allow data exchange with an external processing device such as a personal computer through an infrared light interface. This configuration enables unified data management.

The sensor 1601 for body temperature measurement is controlled by the controller section. Where a sensor for measurement of a parameter other than body temperature, such as a respiratory rate, blood pressure, or a pH value of saliva, it is also controlled by the controlled section.

Examples of items to be displayed on the display 1600 are measurement results of body temperature, an average body temperature, a variation of body temperature, a variation of body temperature in a month or week, and a graph showing expected body temperature values.

The apparatus may adapted to perform a blood pressure measurement through a separate adaptor, and display, on the display, a variation of blood pressure and its relationships with health conditions, meals, and other factors.

The apparatus may also be adapted to measure various parameters such as a respiratory rate and a pH value of saliva, in which case necessary sensors are attached externally.

An example of a function of the apparatus of this embodiment will be described below. For example, the apparatus may be given the following function. Contents of meals taken in a week are input to the apparatus. Based on that information, the apparatus calculates amounts of salt and fat contained those meals, and performs processing to obtain, for instance, a relationship between those amounts and variations of body temperature and blood pressure. Then, the apparatus displays, on the display, instructions on contents of meals to be taken in the future.

The apparatus may also be adapted to produce a graph showing relationships between health-condition indicative parameters such as body temperature, blood pressure, and a pulse rate and daily walking distances (or exercise amounts), to thereby provide certain information that will be helpful in conducting exercise in the future.

It is preferred that all of the above information be displayed on the display 1600 in the form of a graph or FIGS. 1603 to facilitate its understanding.

The apparatus of this embodiment can effectively be used as a total health-care apparatus that receives values of such parameters as sleeping hours and an eating time, processes correlations between those parameters and other parameters such as body temperature, and analyzes health conditions based on results of the processing.

All of the above control operations are performed by the controller that is integrated on the same substrate as the display section. After necessary information processing is performed, results are displayed on the display section.

This embodiment can simplify the entire configuration of the apparatus, to maximize the advantages as a portable apparatus.

Although the above embodiment is directed to the case of using a liquid crystal panel, some other display device such as a plasma display or an EL display may also be used.

(Embodiment 3)

Figure 17:
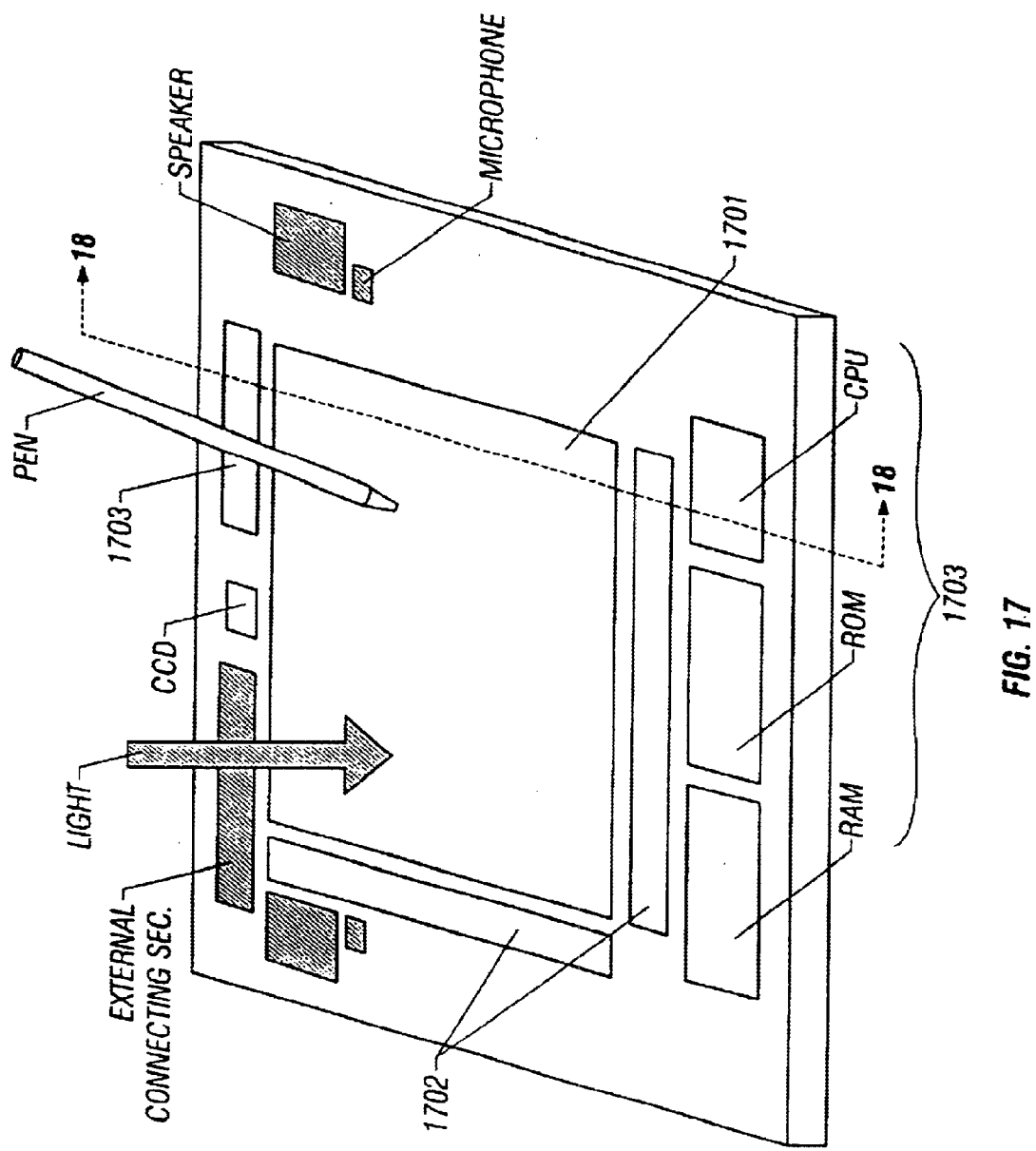
FIG. 17 shows a general configuration of a liquid crystal panel according to Example 5 of the invention.

This embodiment is directed to a case of using a liquid crystal panel that incorporates a controller typified by a CPU. FIG. 17 shows a general configuration of a liquid crystal panel according to this embodiment.

In the liquid crystal panel of this embodiment, an active matrix pixel area 1701 (active matrix area), peripheral driver circuits 1702 for driving the active matrix area 1701, and a controller circuit 1703 are integrated on the same substrate. The controller circuit 1703 comprises a RAM, a ROM, a CPU and an I/O circuit.

The respective circuits may be arranged according to not only the layout of FIG. 17, but also the layouts of FIGS. 10A–10C.

Figure 18:
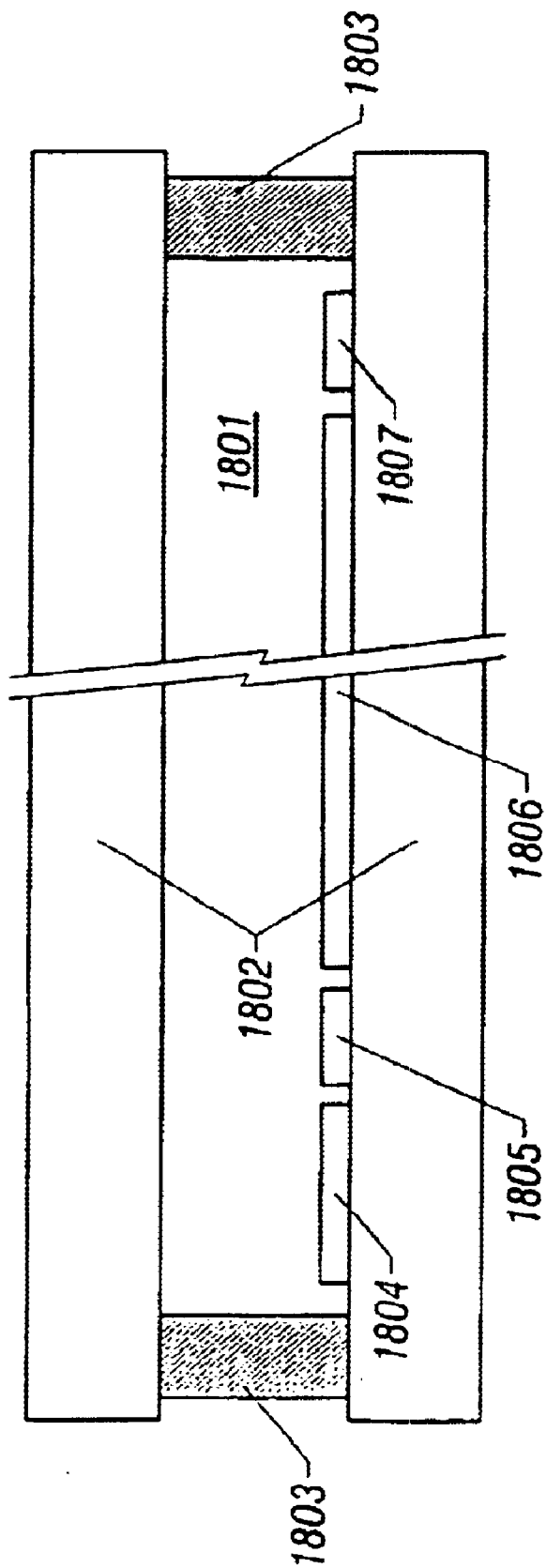
FIG. 18 is a sectional view of the liquid crystal panel of FIG. 17.

FIG. 18 is a sectional view taken along line A-A' in FIG. 17. According to this embodiment, as shown in FIG. 18 (not apparent from FIG. 17), a liquid crystal 1801 is interposed between glass or quartz substrates 1802 opposed to each other.

A sealing member 1803 prevents a liquid crystal material 1801 from leaking out the space between the substrates 1802. The sealing member 1803 also has a role of bonding together the two substrates 1802.

As shown in FIG. 18, all the circuits (a CPU 1804, a peripheral circuit 1805, a display section 1806 and an I/O circuit 1807) are provided inside the sealing member 1803 that bonds together the two substrates 1802. That is, all the circuits are sealed by the liquid crystal material 1801

The controller circuit (1804, 1805, 1807), which is provided inside the sealing member 1803, operates and controls various devices.

For example, the controller circuit controls the fan and on/off-controls the power supply switch, both of which were described in the first embodiment.

Further, the controller may also control the sensors for measuring body temperature and blood pressure, respectively, which sensors were described in the second embodiment.

The above configuration can suppress influences of external force and static electricity, and external moisture and impurities, because the respective circuits are sealed in the liquid crystal material.

In this embodiment, as shown in FIG. 17, the apparatus may be adapted to enable information input through the display by use of a special pen.

Simplifying the entire configuration of the apparatus, this embodiment can increase the application range of the apparatus, i.e., its versatility.

As described above, the invention can provide a flat panel display device that is highly integrated and has high versatility.

The invention can also provide a compact, multi-function display device that not only is conveniently used in a stationary state but also can be moved easily. Further, the invention can realize a multi-function, portable information terminal having a display for displaying information.

What is claimed is:

1. An active matrix display device comprising:

a first substrate;

a second substrate having a thin portion and a thick portion opposed to said first substrate;

a liquid crystal material formed between said first substrate and said second substrate;

a sealing material formed between said first substrate and said second substrate;

a pixel region comprising a plurality of TFTs formed over said first substrate and below said thick portion of said second substrate;

a driver circuit comprising a plurality of TFTs for driving said pixel region, formed over said first substrate and below said thick portion of said second substrate; and an integrated circuit for controlling said driver circuit, formed over said first substrate and below said thin portion of said second substrate, wherein said sealing material covers said integrated circuit.

2. An active matrix display device according to claim 1 wherein said sealing material serves as a shock-absorbing material for said integrated circuit.

3. An active matrix display device comprising:

a first substrate;

a second substrate having a thin portion and a thick portion opposed to said first substrate;

a liquid crystal material formed between said first substrate and said second substrate;

a sealing material formed between said first substrate and said second substrate;

a pixel region comprising a plurality of TFTs formed over said first substrate and below said thick portion of said second substrate;

a driver circuit comprising a plurality of TFTs for driving said pixel region, formed over said first substrate and below said thick portion of said second substrate; and an integrated circuit for controlling said driver circuit, formed over said first substrate and below said thin portion of said second substrate;

wherein said sealing material covers said driver circuit and said integrated circuit.

4. An active matrix display device according to claim 3 wherein said sealing material serves as a shock-absorbing material for said integrated circuit.

5. An active matrix display device comprising:

a first substrate;

a second substrate having a thin portion and a thick portion opposed to said first substrate;

a liquid crystal material formed between said first substrate and said second substrate;

a pixel region formed over said first substrate;

a driver circuit for driving said pixel region, formed over said first substrate;

an integrated circuit for controlling said driver circuit, formed over said first substrate and below said thin portion of said second substrate; and a sealing material formed between said first substrate and said thin portion of said second substrate, wherein said sealing material covers said integrated circuit.

6. An active matrix display device according to claim 5 wherein said sealing material serves as a shock-absorbing material for said integrated circuit.

7. An active matrix display device comprising:

a first substrate;

a second substrate having a thin portion and a thick portion opposed to said first substrate;

a liquid crystal material formed between said first substrate and said second substrate;

a pixel region formed over said first substrate;

a driver circuit for driving said pixel region, formed over said first substrate;

an integrated circuit for controlling said driver circuit, formed over said first substrate and below said thin portion of said second substrate; and a sealing material formed between said first substrate and said second substrate, wherein said sealing material covers said driver circuit and said integrated circuit.

8. An active matrix display device according to claim 7 wherein said sealing material serves as a shock-absorbing material for said integrated circuit.

9. An active matrix display device comprising:

a first substrate;

a second substrate having a thin portion and a thick portion opposed to said first substrate;

a liquid crystal material formed between said first substrate and said second substrate;

a sealing material formed between said first substrate and said second substrate;

a pixel region formed over said first substrate;

a driver circuit for driving said pixel region, formed over said first substrate; and a microprocessor for controlling said driver circuit, formed over said first substrate and below said thin portion of said second substrate, wherein said sealing material covers said microprocessor.

10. An active matrix display device according to claim 9 wherein said sealing material serves as a shock-absorbing material for said microprocessor.

11. An active matrix display device comprising:

a first substrate;

a second substrate having a thin portion and a thick portion opposed to said first substrate;

a liquid crystal material formed between said first substrate and said second substrate;

a sealing material formed between said first substrate and said second substrate;

a pixel region formed over said first substrate;

a driver circuit for driving said pixel region, formed over said first substrate; and a microprocessor for controlling said driver circuit, formed over said first substrate and below said thin portion of said second substrate, wherein said sealing material covers said microprocessor and said driver circuit.

12. An active matrix display device according to claim 11 wherein said sealing material serves as a shock-absorbing material for said microprocessor.

13. An active matrix display device comprising:

a first substrate;

a second substrate having a thick portion and a thin portion opposed to said first substrate;

a liquid crystal material formed between said first substrate and said second substrate;

a sealing material formed between said first substrate and said second substrate;

a pixel region formed over said first substrate and below said thick portion of said second substrate;

a driver circuit for driving said pixel region, formed over said first substrate and below said thick portion of said second substrate; and a microprocessor for controlling said driver circuit and below said thin portion of said second substrate, formed over said first substrate, wherein said sealing material covers said microprocessor.

14. An active matrix display device according to claim 13 wherein said sealing material serves as a shock-absorbing material for said microprocessor.

15. An active matrix display device comprising:

a first substrate;

a second substrate having a thick portion and a thin portion opposed to said first substrate;

a liquid crystal material formed between said first substrate and said second substrate;

a sealing material formed between said first substrate and said second substrate;

a pixel region formed over said first substrate and below said thick portion of said second substrate;

a driver circuit for driving said pixel region, formed over said first substrate and below said thick portion of said second substrate; and a microprocessor for controlling said driver circuit, formed over said first substrate and below said thin portion of said second substrate, wherein said sealing material covers said microprocessor and said driver circuit.

16. An active matrix display device according to claim 15 wherein said sealing material serves as a shock-absorbing material for said microprocessor.

* * * * *